(12) United States Patent
Jang et al.

(10) Patent No.: US 10,229,297 B2
(45) Date of Patent: Mar. 12, 2019

(54) METHOD AND APPARATUS TO WRITE TAG USING NEAR FIELD COMMUNICATION

(71) Applicant: S-Printing Solution Co., Ltd., Suwon-si (KR)

(72) Inventors: Wu-seok Jang, Seoul (KR); Naveen Maheshwari, Suwon-si (KR); Hak-ju Lee, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 135 days.

(21) Appl. No.: 15/259,748

(22) Filed: Sep. 8, 2016

(65) Prior Publication Data
US 2016/0381496 A1 Dec. 29, 2016

Related U.S. Application Data

(62) Division of application No. 14/288,665, filed on May 28, 2014.

(30) Foreign Application Priority Data

Jun. 3, 2013 (KR) ........................ 10-2013-0063703

(51) Int. Cl.
*H04W 4/00* (2018.01)
*G06K 7/10* (2006.01)
(Continued)

(52) U.S. Cl.
CPC .......... *G06K 7/10297* (2013.01); *H04L 67/02* (2013.01); *H04N 1/00307* (2013.01);
(Continued)

(58) Field of Classification Search
None
See application file for complete search history.

(56) References Cited

U.S. PATENT DOCUMENTS 9,253,362 B2 * 2/2016 Urakawa ............ H04N 1/32358
2007/0046467 A1 3/2007 Chakraborty et al.
(Continued)

FOREIGN PATENT DOCUMENTS

| KR | 10-2007-0054172 A | 5/2007 |
| KR | 10-2007-0057583 A | 6/2007 |
| KR | 10-2013-0051675 A | 5/2013 |

OTHER PUBLICATIONS

"Near Field Communication (NFC)—Explained/The Complete Guide", Jun. 20, 2012, http://blog.clove.co.uk/2012/06/20/near-field-communication-nfc-explained-the-complete-guide/.*
(Continued)

*Primary Examiner* — Thomas D Lee
(74) *Attorney, Agent, or Firm* — Jefferson IP Law, LLP

(57) ABSTRACT

A method of writing a near field communication (NFC) tag using a mobile terminal includes establishing a wireless connection between the mobile terminal and an image forming apparatus, extracting a predetermined field value corresponding to a data structure of the NFC tag from information collected while establishing the wireless connection, generating tag information including the predetermined field value by arranging the predetermined field value according to the data structure, and writing the tag information to the NFC tag through NFC tagging.

10 Claims, 25 Drawing Sheets

(51) Int. Cl.
*H04L 29/08* (2006.01)
*H04N 1/00* (2006.01)
*H04W 12/04* (2009.01)
*H04W 4/80* (2018.01)
*H04W 88/02* (2009.01)
*H04W 12/06* (2009.01)

(52) U.S. Cl.
CPC ............. *H04W 4/80* (2018.02); *H04W 12/04* (2013.01); *H04N 2201/006* (2013.01); *H04N 2201/0094* (2013.01); *H04W 12/06* (2013.01); *H04W 88/02* (2013.01)

(56) References Cited

U.S. PATENT DOCUMENTS

| | | |
|---|---|---|
| 2007/0086047 A1 | 4/2007 | Oh |
| 2008/0178170 A1 | 7/2008 | Abe et al. |
| 2011/0088084 A1 | 4/2011 | Yasaki et al. |
| 2011/0207401 A1* | 8/2011 | Han .................. H04B 5/0062 455/41.1 |
| 2012/0290694 A9 | 11/2012 | Marl et al. |
| 2012/0322411 A1 | 12/2012 | Lazarev et al. |
| 2013/0045681 A1 | 2/2013 | Dua |
| 2013/0058274 A1 | 3/2013 | Scherzer et al. |
| 2013/0108047 A1* | 5/2013 | Lu ...................... H04W 12/02 380/270 |
| 2014/0240778 A1* | 8/2014 | Itogawa ................ G06F 3/1292 358/1.15 |
| 2014/0333419 A1 | 11/2014 | Zehler |

OTHER PUBLICATIONS

"NFC", Mar. 8, 2011, http://www.nfc.cc/technology/nfc/.*

* cited by examiner

<NFC enabled phone>

<NFC enabled phone>

| Connection with image forming apparatus | Installation of mobile application | Page of mobile application | Event according to NFC tagging |
|---|---|---|---|
| Disconnected | Not installed | N/A | Establishment of connection with image forming apparatus and installation of mobile printing application |
| Connected | Installed | N/A | Establishment of connection with image forming apparatus and execution of mobile printing application |
| Connected | Installed | Print job page | Document rendering and document print command to image forming apparatus |
| Connected | Installed | Print job page | Document scan command to image forming apparatus |
| Connected | Installed | Fax job page | Local document/scan document fax command to image forming apparatus |
| Connected | Installed | Initial page | Request for status information from image forming apparatus |
| Disconnected | Installed | Initial page | Establishment of connection with image forming apparatus and request for status information |

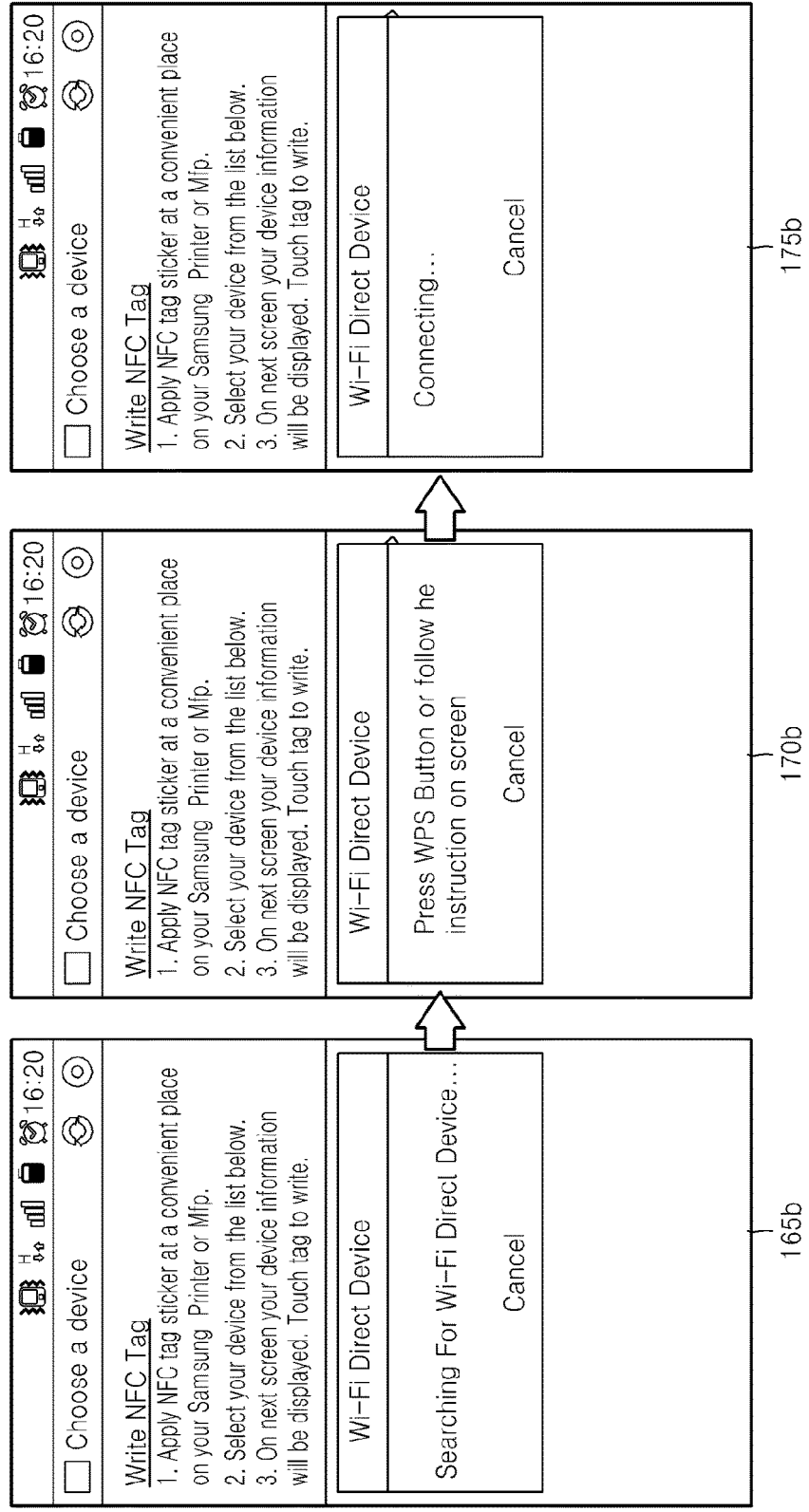

METHOD AND APPARATUS TO WRITE TAG USING NEAR FIELD COMMUNICATION

CROSS-REFERENCE TO RELATED APPLICATIONS

This application is a divisional application of prior application Ser. No. 14/288,665, filed on May 28, 2014, and claimed the benefit under 35 U.S.C. § 119(a) from Korean Patent Application No. 10-2013-0063703, filed on Jun. 3, 2013, in the Korean Intellectual Property Office, the disclosure of which is incorporated herein in its entirety by reference.

BACKGROUND OF THE INVENTION

1. Field of the Invention

The present inventive concept relates to a method and apparatus to write a tag of an image forming apparatus based on near field communication (NFC).

2. Description of the Related Art

As mobile communication technologies develop and mobile communication terminals have become popular, mobile terminals such as smartphones, tablet PCs, PDA, etc. replace conventional personal computers. In the field of image forming apparatuses such as printers, scanners, facsimiles, copiers, or multifunctional peripherals (MFPs), a technology of directly operating an image forming apparatus with a mobile terminal, without using a PC, is being developed.

In particular, to overcome the limitations of an interface of a mobile terminal and to guarantee mobility, communication between an image forming apparatus and a mobile terminal is performed in a wireless manner. However, a wireless connection process according to a conventional technology is not only complicated and inconvenient, but also requires that a user have previous knowledge about a wireless network.

In addition, since a mobile application provided to operate an image forming apparatus on a mobile terminal is operated in an environment different from a PC environment, a user who is not familiar with the operation of the mobile application may have difficulty operating the image forming apparatus.

SUMMARY OF THE INVENTION

The present general inventive concept provides a method and apparatus to write a near field communication (NFC) tag of an image forming apparatus.

The present general inventive concept also provides a computer-readable recording medium having recorded thereon a program to execute the method on a computer.

Additional features and utilities of the present general inventive concept will be set forth in part in the description which follows and, in part, will be obvious from the description, or may be learned by practice of the general inventive concept.

Exemplary embodiments of the present general inventive concept provide a method of writing a near field communication (NFC) tag using a mobile terminal, the method including establishing a wireless connection between the mobile terminal and an image forming apparatus, extracting a predetermined field value corresponding to a data structure of the NFC tag from information collected while establishing the wireless connection, generating tag information including the predetermined field value by arranging the predetermined field value according to the data structure, and writing the tag information to the NFC tag through NFC tagging.

The predetermined field may include at least one of a device identifier included in a third field of the tag information, a device model name included in a fifth field of the tag information, a device capability included in a sixth field of the tag information, and a wireless connection type included in a seventh field of the tag information.

The method may further include discovering one or more candidate devices capable of performing an image forming job under control of a mobile application that is currently executed, selecting one of the discovered candidate devices as the image forming apparatus, and establishing the wireless connection with the image forming apparatus.

In the discovery of the one or more candidate devices, at least one of an Internet protocol (IP) address, a device model name, and a device identifier of the candidate devices is collected according to wireless connection signaling of the candidate devices or an access point (AP) connected to the candidate devices, and the predetermined field value includes at least one of the IP address, the device model name, and the device identifier of the candidate device selected as the image forming apparatus.

The establishing of the wireless connection may include performing response signaling including obtaining device capability of the image forming apparatus with respect to the wireless connection signaling of the image forming apparatus or an access point (AP) connected to the image forming apparatus, and extracting the predetermined field value includes extracting the device capability of the image forming apparatus obtained through the wireless connection.

The generating of the tag information may include obtaining a field value different from the predetermined field value through a mobile application that controls the image forming apparatus to perform an image forming job, and arranging the field value different from the predetermined field value according to the data structure.

The field value different form the predetermined field value may include at least one of an application identifier included in a first field of the tag information and application installation information included in a second field of the tag information, and the application identifier and the application installation information are respectively used to automatically execute or install the mobile application in a predetermined NFC device when the NFC tag is NFC tagged by the predetermined NFC device.

The method may further include obtaining an authentication code to establish a wireless connection with the image forming apparatus, and encrypting the authentication code. In the generating of the tag information, the encrypted authentication code may be arranged in a fourth field of the tag information.

Regarding a position of the NFC tag corresponding to a fourth field including an authentication code needed to establish a wireless connection with the image forming apparatus, the writing of the tag information may include one of writing a random value, writing a null value, and skipping writing.

The method may further include updating firmware (FW) of the image forming apparatus as the mobile terminal or the image forming apparatus accesses a FW providing server. The updated FW may automate Wi-Fi protected setup (WPS) authentication between the image forming apparatus and a predetermined NFC device that obtains an authentication code included in a fourth field of the tag information written to the NFC tag.

The method may further include setting an authentication code of a wireless connection with the image forming apparatus in firmware (FW) of the image forming apparatus as the mobile terminal or the image forming apparatus accesses a web page provided by a web server included in the image forming apparatus. The authentication code may be written at a position of the NFC tag corresponding to a fourth field of the tag information.

The method may further include switching a mode from a write mode to a read mode when writing of the tag information is completed, obtaining the tag information written to the NFC tag through NFC tagging in the read mode, switching the mode back to the write mode and receiving an input of a new authentication code when authentication of a wireless connection with the image forming apparatus by using a fourth field of the tag information fails, and writing the new authentication code to the NFC tag through NFC tagging in the write mode.

In an exemplary embodiment of the present general inventive concept, there is provided a non-transitory computer readable recording medium having recorded thereon a program to execute the above method.

Exemplary embodiments of the present general inventive concept also provide a mobile terminal to write a near field communication (NFC) tag, including a wireless communication module to establish a wireless connection between the mobile terminal and an image forming apparatus, a control unit to extract a predetermined field value corresponding to a data structure of the NFC tag from information collected while establishing the wireless connection, to arrange the predetermined field value according to the data structure, and to generate tag information including the predetermined field value, and an NFC module to write the tag information to the NFC tag through NFC tagging.

The predetermined field value of the control unit extracts from the collected information may include at least one of a device identifier included in a third field of the tag information, a device model name included in a fifth field of the tag information, a device capability included in a sixth field of the tag information, and a wireless connection type included in a seventh field of the tag information.

The wireless communication module may discover one or more candidate devices capable of performing an image forming job under control of a mobile application that is currently executed, select one of the discovered candidate devices as the image forming apparatus, and establish the wireless connection with the image forming apparatus.

The wireless communication module may collect at least one of an Internet protocol (IP) address, a device model name, and a device identifier of the one or more candidate devices according to wireless connection signaling of the candidate devices or an access point (AP) connected to the candidate devices, and the control unit may extract at least one of the IP address, the device model name, and the device identifier of the candidate device selected as the image forming apparatus.

The wireless communication module may perform response signaling including obtaining device capability of the image forming apparatus with respect to the wireless connection signaling of the image forming apparatus or an access point (AP) connected to the image forming apparatus, and the control unit extracts the device capability of the image forming apparatus obtained through the wireless connection.

The control unit may obtain a field value different from the predetermined field value through a mobile application that controls the image forming apparatus to perform an image forming job, and may arrange the field value different from the predetermined field value according to the data structure.

The field value different from the predetermined field value may include at least one of an application identifier included in a first field of the tag information and application installation information included in a second field of the tag information, and the application identifier and the application installation information are respectively used to automatically execute or install the mobile application in a predetermined NFC device when the NFC tag is NFC tagged by the predetermined NFC device.

The mobile terminal may further include a user interface unit to obtain an authentication code needed to establish a wireless connection with the image forming apparatus. The control unit may generate the tag information by encrypting the authentication code and arranging the encrypted authentication code in a fourth field of the tag information.

Regarding a position of the NFC tag corresponding to a fourth field including an authentication code needed to establish a wireless connection with the image forming apparatus, the NFC module may write a random value, write a null value, or skip writing.

The control unit may update firmware (FW) of the image forming apparatus as the mobile terminal or the image forming apparatus accesses a FW providing server. The updated FW may automate Wi-Fi protected setup (WPS) authentication between the image forming apparatus and a predetermined NFC device that obtains an authentication code included in a fourth field of the tag information written to the NFC tag.

The control unit may set an authentication code of a wireless connection with the image forming apparatus in firmware (FW) of the image forming apparatus as the mobile terminal or the image forming apparatus accesses a web page provided by a web server included in the image forming apparatus. The authentication code may be written at a position of the NFC tag corresponding to a fourth field of the tag information.

The NFC module, at a request of the control unit, may switch a mode from the write mode to a read mode when writing of the tag information is completed, obtain the tag information written to the NFC tag through NFC tagging in the read mode, switch the mode back to the write mode and receive an input of a new authentication code when authentication of a wireless connection with the image forming apparatus by using a fourth field value of the tag information fails, and write the new authentication code to the NFC tag through NFC tagging in the write mode.

Exemplary embodiments of the present general inventive concept also provide a system that includes a mobile terminal, an image forming apparatus, and a near field communication (NFC) tag. The image forming apparatus establishes a wireless connection with the mobile terminal according to a wireless connection request of the mobile terminal and outputs a personal identification number (PIN) value set in firmware (FW) of the image forming apparatus, and the mobile terminal extracts a predetermined field value corresponding to a data structure of the NFC tag from information collected in a wireless connection establishment process with the image forming apparatus, arranges the predetermined field value according to the data structure, generates the tag information including the predetermined field value, and writes the tag information to the NFC tag.

Exemplary embodiments of the present general inventive concept also provide a method of writing a near field communication (NFC) tag using a mobile terminal, the method including obtaining device information of an electronic device, generating tag information corresponding to the obtained device information, the tag information being arranged according to a data structure of the NFC tag, and writing the tag information to the NFC tag through an NFC connection.

The tag information may include a plurality of discrete fields, the fields respectively corresponding to distinct portions of the obtained device information.

Exemplary embodiments of the present general inventive concept also provide a mobile terminal to write a near field communication (NFC) tag, the mobile terminal including a communication unit to obtain device information of an electronic device, a control unit to generate tag information corresponding to the obtained device information, the tag information being arranged according to a data structure of the NFC tag, and an NFC unit to write the tag information to the NFC tag through an NFC connection.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 12 illustrates events according to NFC tagging according to an exemplary embodiment of the present general inventive concept;

FIGS. 14A, 14B, 14C, 14D, and 14E illustrates GUIs in a process of writing an NFC tag according to exemplary embodiments of the present general inventive concept;

DETAILED DESCRIPTION OF THE EMBODIMENTS

Figure 1A:
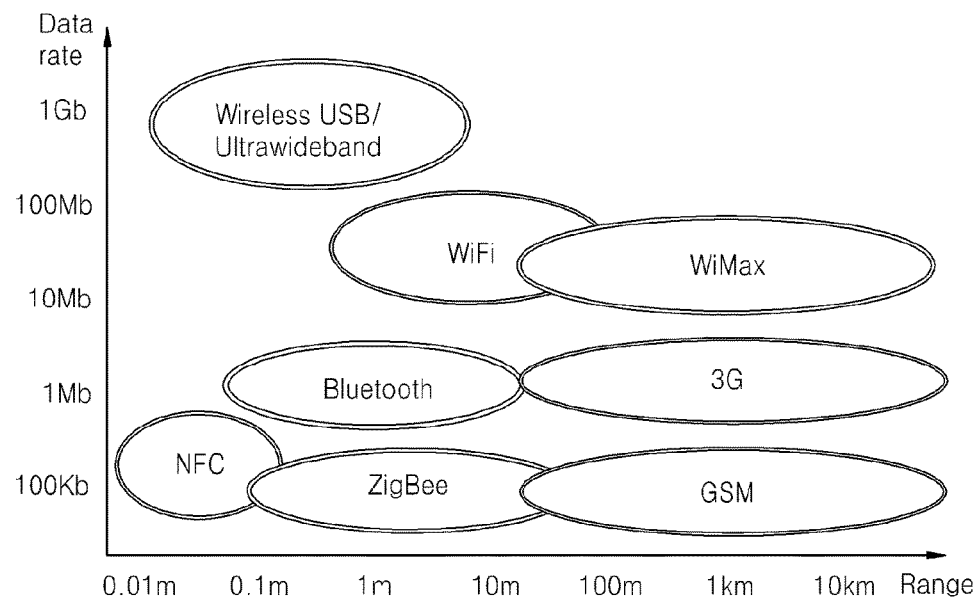
FIG. 1A is a graph showing a comparison between a data rate and a communication range of NFC and other wireless communication methods.

The attached drawings illustrating exemplary embodiments of the present general inventive concept are referred to in order to gain a sufficient understanding thereof, the merits thereof, and the objectives accomplished by the implementation of the present general inventive concept. Hereinafter, the present general inventive concept will be described in detail by explaining exemplary embodiments of the general inventive concept with reference to the attached drawings. Like reference numerals in the drawings denote like elements.

As used herein, expressions such as "at least one of," when preceding a list of elements, modify the entire list of elements and do not modify the individual elements of the list.

Figure 3A:
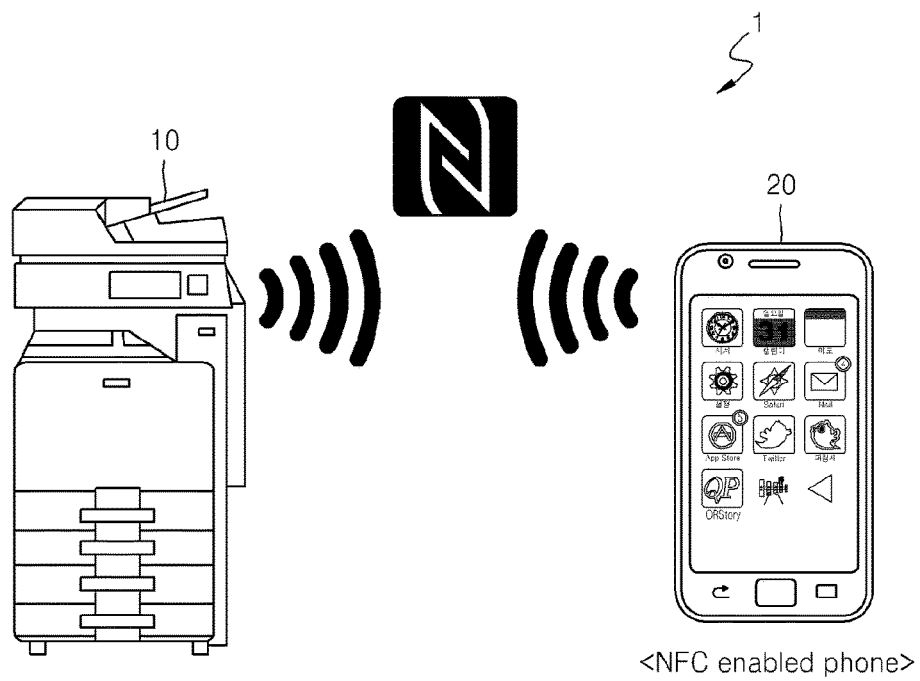
FIG. 3A illustrates an NFC environment according to an exemplary embodiment of the present general inventive concept.
Figure 3B:
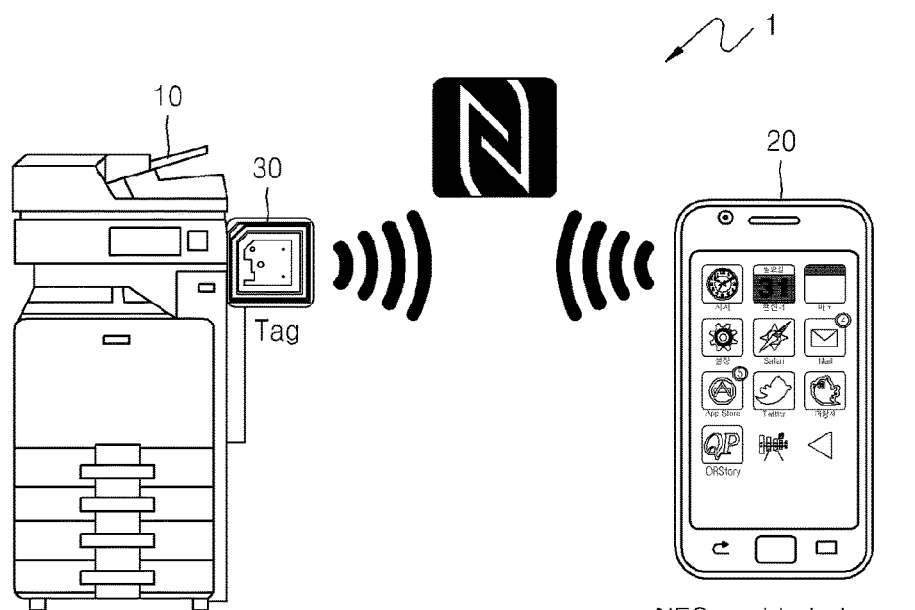
FIG. 3B illustrates an NFC environment similar to that of FIG. 3A, according to an embodiment of the present inventive concept.
Figure 3C:
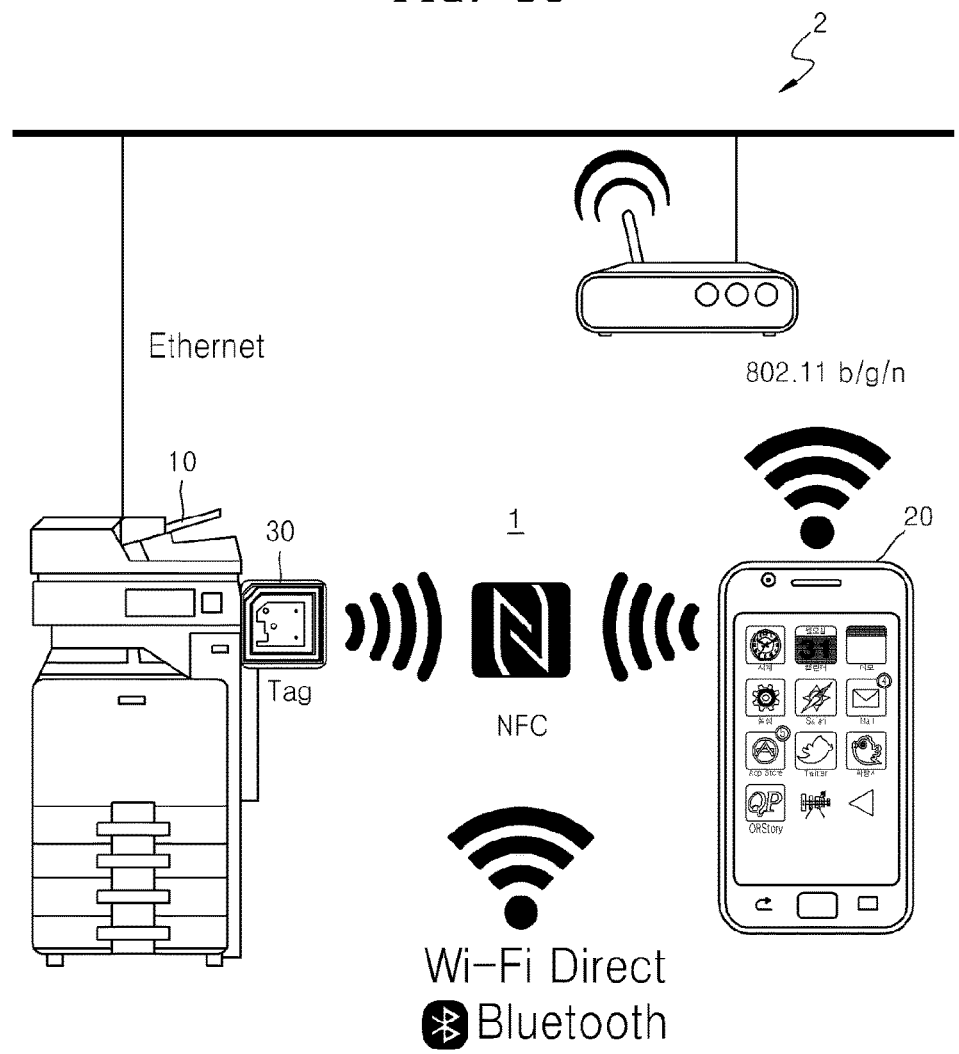
FIG. 3C illustrates a wireless communication environment where an image forming apparatus and a mobile terminal exist, according to an exemplary embodiment of the present general inventive concept.

The exemplary embodiments of the present general inventive concept described herein relate to control of electronic apparatuses through a mobile terminal 10 (illustrated in FIG. 3A-3C). An electronic apparatus may be any device which may be controlled through a mobile application 2502 (illustrated in FIG. 4), the mobile application 2502 receiving information about the electronic apparatus through an NFC tag 30 (illustrated in FIG. 3B). This may include for example a display apparatus or an image forming apparatus 10 (illustrated in FIGS. 3A-3B). As used herein, an image forming apparatus 10 is an apparatus having an image forming function, including but not limited to a facsimile machine, a printer, a scanner, and a multi-function peripheral (MFP) combining multiple different image forming functions.

FIG. 1A is a graph showing a comparison between a data rate and a communication range of NFC and other wireless communication methods. Referring to FIG. 1A, when compared with other wireless communication methods, near field communication (NFC) may be performed within a range of about 10 cm. In other words, unlike Bluetooth, Wi-Fi, etc., capable of communicating from several meters to tens of meters, NFC communicates within an extremely short range of about 10 cm.

NFC may be compared with other wireless communication methods such as Bluetooth, Zigbee, etc., as described in Table 1.

TABLE 1

| Technology | Frequency in use | Security | Standard range | Main service area |
|---|---|---|---|---|
| NFC | 13.56 MHz | Encryption applied | International Standard | Non-contact payment, RFID, File transfer |
| Bluetooth | 2.4 GHz | Not applied | International Standard | File transfer |
| Zigbee | 2.4 GHz | Not applied | International Standard | Device control, RFID |
| 900 MHz RFID | 900 MHz | Not applied | Domestic (KR) Standard | RFID |

In other words, when compared with other wireless communication methods, NFC that operates only within a range of about 10 cm and adopts encryption technology has high security. Accordingly, when used in combination with other high-speed wireless communication methods such as 3G, 4G, Wi-Fi, etc., NFC may facilitate efficient communication between devices. For example, when NFC technology and Bluetooth technology are combined with each other, the NFC technology is used to connect (authentication) between devices and the Bluetooth technology is used to transfer data between devices, so that the devices may efficiently communicate with each other.

Figure 1B:
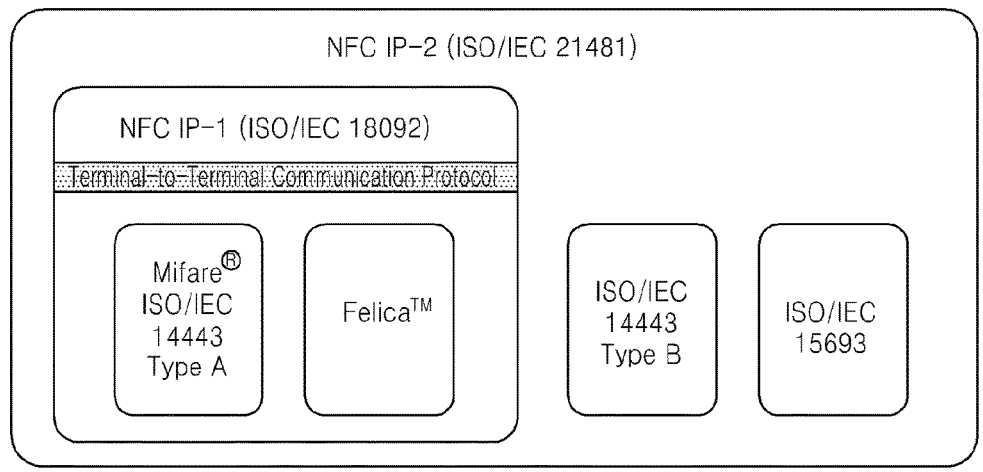
FIG. 1B illustrates standards related to an NFC technology.

FIG. 1B illustrates standards related to the NFC technology. The NFC standard technology follows the international organization for standardization (ISO) and is an extension of an ISO 14443 proximity-card standard. FIG. 1B illustrates the inclusion relationship between the NFC Interface Protocol-1 (NFC IP-1) (ISO/IEC 18092) standard and the NFC IP-2 (ISO/IEC 21481) standard. ISO/IEC 14443 Type A and Type B, FeliCa, and ISO/IEC 15693 are international standards for a non-contact type card operating at a frequency of 13.56 MHz. ISO/IEC 18092 defines a communication mode for NFC interface and protocol.

Figure 2A:
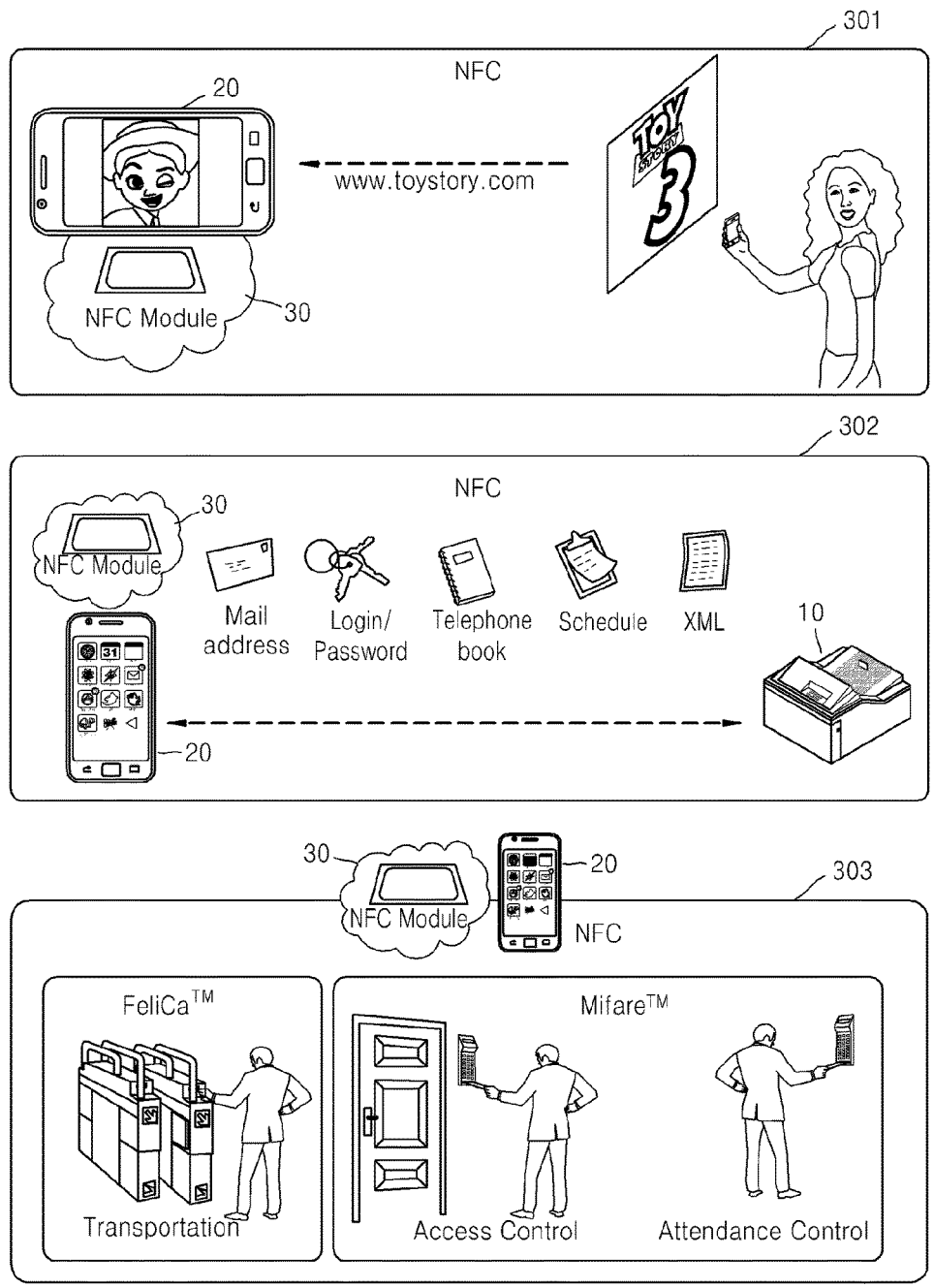
FIGS. 2A and 2B are view explaining three communication modes of NFC.
Figure 2B:
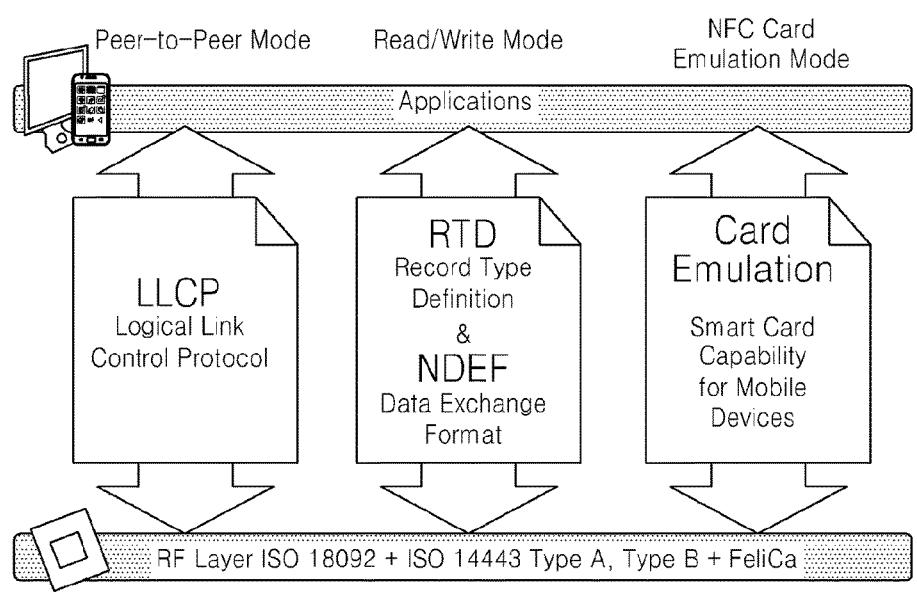

FIGS. 2A and 2B are views explaining three communication modes of the NFC. Referring to FIG. 2A, the NFC forum classifies major communication modes of NFC into three of a reader/writer mode 301, a P2P mode 302, and a card emulation mode 303 for standardization. The three communication modes of NFC may be summarized as shown in Table 2.

or as a writer to write information to the NFC module (tag 30). The device including an NFC chipset and the NFC tag 30 may be separated from each other. The NFC tag 30 may exist outside the device that operates in the reader/writer mode 301. For example, the NFC tag 30 may be a passive tag included in, attached to, or otherwise associated with another device. Specifically, an NFC tag 30 of a particular device may be located at a distance from the device, but in a location convenient to be read by the device including the NFC chipset. For example, the NFC tag 30 could be located on the desk of a user of the mobile terminal 20, thereby allowing the user to read the NFC tag 30 with the mobile terminal 20 without needing to move away from their desk. If the other device does not include an NFC tag, the other device may not read or write the passive tag. If the NFC tag 30 is an active tag included in the other device, the other device may read or write the NFC tag 30 through an NFC function. Although an active tag may be difficult to install after manufacturing on a device that does not support the NFC function, a passive tag associated with a device that does not support the NFC function may be installed or removed similar to a sticker from a location chosen by the user. In this manner, the passive NFC tag may be placed in a location convenient to the user.

The NFC module may include a semiconductor device (not illustrated) to permanently or temporarily store data. The stored data may be modified or changed depending on an input from an external device, such as for example the mobile terminal 20.

The P2P mode 302 supports bidirectional communication between two NFC devices. To establish a connection, a client, that is, an NFC P2P initiator, discovers a host, that is, an NFC P2P target, and transmits data in an NDEF message format to the host. The client may be for example a mobile terminal 20, and the host may be for example an image forming apparatus 10. The data may include for example mail address information, login/password information, telephone book information, schedule information, and/or xml data. According to the P2P mode 302, although data exchange between devices is possible, a data rate is the

TABLE 2

|  | ISO/IEC 15693 | ISO/IEC 18092 | ISO/IEC 14443 |
|---|---|---|---|
| Operation mode | Communication between reader/tag (VCD2 mode) | Communication between devices (P2P mode) | Communication between reader/tag (PCD1 mode) |
| Power supply | Passive | Active and passive | Passive |
| Communication range | 1 m | 10~20 cm | 10 cm |
| Data rate | 26 kbps or less | 106, 212, 424 Kbps | 106 Kbps |

(PCD: Proximity Coupling Device, VCD: Vicinity Coupling Device)

First, in the reader/writer mode 301, a device including an NFC chipset, such as a mobile terminal 20, operates as a reader to read and NFC module, for example an NFC tag 30 maximum 424 Kbps or less, and thus the P2P mode 302 is appropriate for the exchange of data having a relatively small size.

In the card emulation mode 303, a mobile terminal 20 including an NFC tag 30 operates like a smart card (ISO/IEC 14443). Accordingly, the card emulation mode 303 is compatible with the ISO 14443 that is an international standard for a non-contact card as well as FeliCa by Sony and MiFare by Philips.

As illustrated in FIG. 2B, a protocol is standardized so that the three communication modes of NFC may be organically provided. FIG. 2B illustrates a software structure in an NFC system.

A logical link control protocol (LLCP) is a protocol for connection and control of communication between layers. An NFC data exchange format (NDEF) message is a basic message structure defined by the NFC communication protocol. NDEF defines a record format about message exchange between a device and a tag and is a standard exchange format about a uniform resource identifier (URI), a smart poster, and others. An NDEF message includes one or more NDEF records. An NDEF record includes a payload described by each of a type, a length, and an option identifier. An NDEF payload means application data included in the NDEF record. A record type definition (RTD) defines a record type and a type name that may correspond to the NDEF record. A Card Emulation allows smart card capability for mobile devices.

FIG. 3A illustrates an NFC environment 1 according to an exemplary embodiment of the present general inventive concept. Referring to FIG. 3A, the NFC environment 1 includes an image forming apparatus 10 supporting an NFC function and a mobile terminal 20 supporting an NFC function. The image forming apparatus 10 illustrated in FIG. 3A including an NFC chipset may operate in the P2P mode 302 using the NFC function with the mobile terminal 20. However, the image forming apparatus 10 of FIG. 3A may operate not only in the P2P mode 302 but also in the reader/writer mode 301 and the card emulation mode 303. The mobile terminal 20 is detailed below with reference to FIG. 4, and the image forming apparatus 10 is detailed below with reference to FIG. 6.

FIG. 3B illustrates an NFC environment 1 similar to that of FIG. 3A, according to an exemplary embodiment of the present general inventive concept. Referring to FIG. 3B, the NFC environment 1 includes the image forming apparatus 10 supporting an NFC function and the mobile terminal 20 supporting an NFC function like the NFC environment 1 of FIG. 3A. In particular, a difference between the two NFC environments 1 is that while the image forming apparatus 10 of FIG. 3A uses an NFC chipset, the image forming apparatus 10 of FIG. 3B uses an NFC tag 30. When an NFC chipset is in use, all functions of the NFC tag 30 may be performed. For example, when an NFC chipset operates in the card emulation mode 303, the NFC chipset may perform the same function as the NFC tag 30. The function of the NFC tag 30 includes transmitting information written to the NFC tag 30 to the mobile terminal 20 via NFC.

The NFC tag 30 may not be a read only/write only tag, but a read/write tag, so as to be written or modified by the image forming apparatus 10 of FIG. 3B. A read only tag has physical properties that it may not be modified once written. A read/write tag has physical properties in that data once written may be erased or modified. Accordingly, this difference is a different concept from the classification of the passive tag and the active tag.

The NFC tag 30 may be an active tag so as to be written or modified by the image forming apparatus 10 of FIG. 3B. To allow the NFC tag 30 to operate as an active tag, the image forming apparatus 10 of FIG. 3B is provided with a transmission line or an NFC chipset, to transceive data between an IC of the NFC tag 30 and the image forming apparatus 10 of FIG. 3B.

Accordingly, when the NFC tag 30 is attached on a conventional image forming apparatus having no transmission line or an NFC chipset, the NFC tag 30 operates as a passive tag and not an active tag. When the NFC tag 30 operates as a passive tag, the mobile terminal 20 may read or modify information written to the NFC tag 30, but the image forming apparatus 10 of FIG. 3B may not read or modify the information written to the NFC tag 30. When the NFC tag 30 operates as an active tag, both of the mobile terminal 20 and the image forming apparatus 10 of FIG. 3B may read or modify information written to the NFC tag 30. Although an active tag is functionally advantageous because it includes all functions of a passive tag, the passive tag is more easily installed in the image forming apparatus 10 as compared to the active tag.

In the following description, it is assumed that the image forming apparatus 10 of FIG. 3B does not include the NFC tag 30 during manufacturing. Accordingly, the image forming apparatus 10 of FIG. 3B may communicate with the mobile terminal 20 using an NFC function only when the NFC tag 30 is installed in the image forming apparatus 10 of FIG. 3B at a later time than during manufacturing. The image forming apparatus 10 may include at least one slot (not illustrated) to install the NFC tag 30 of an active or passive type at a later time.

If an active tag is installed later in the image forming apparatus 10 of FIG. 3B, the operation of the NFC environment 1 to be described in the present exemplary embodiment may be understood like the NFC environment 1 of FIG. 3A.

Although it is described that only one pair of the image forming apparatus 10 and the mobile terminal 20 exists in the NFC environment 1 for convenience of explanation, a plurality of different types of electronic devices supporting an NFC function may exist in the NFC environment 1, and the electronic devices may operate in the same way as the one described in the present exemplary embodiment.

FIG. 3C illustrates a wireless communication environment 2 where the image forming apparatus 10 and the mobile terminal 20 exist, according to an exemplary embodiment of the present general inventive concept. Referring to FIG. 3C, other surrounding wired/wireless networks are illustrated with the NFC environment 1. The NFC environment 1 may operate in engagement with the surrounding wired/wireless networks such as Wi-Fi Direct, Bluetooth, Ethernet, 802.11a/b/g/n, etc. In the wireless communication environment 2, the image forming apparatus 10 and the mobile terminal 20 may be connected by Wi-Fi Direct or via a Wi-Fi access point (AP) (802.11a/b/g/n) in a wired/wireless manner.

Figure 4:
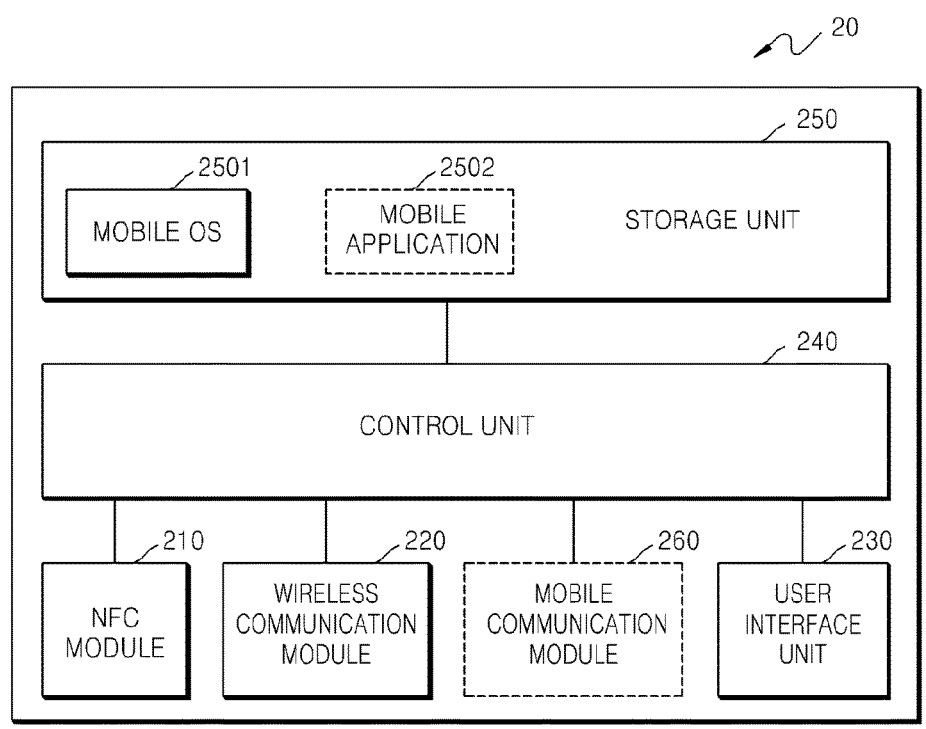
FIG. 4 is a block diagram schematically illustrating a hardware structure of a mobile terminal according to an exemplary embodiment of the present general inventive concept.

FIG. 4 is a block diagram schematically illustrating a hardware structure of the mobile terminal 20 according to an exemplary embodiment of the present general inventive concept. The mobile terminal 20 according to the present exemplary embodiment may be embodied in a variety of forms, for example, a smartphone, a laptop computer, a digital broadcasting terminal, a personal digital assistant (PDA), a portable multimedia player (PMP), a navigation device, a tablet PC, etc.

Referring to FIG. 4, the mobile terminal 20 may include an NFC module 210, a wireless communication module 220, a mobile communication module 260, a user interface unit 230, a control unit 240, and a storage unit 250. The present general inventive concept is not limited thereto and the mobile terminal 20 may further include other common elements (not illustrated) in addition to the above constituent elements. For example, the mobile terminal 20 may further include common elements such as a camera module, a DMB module, a GPS module, an image or voice processor, a power supply unit, a vibration motor, a speaker, a microphone, a main board, etc. Also, all the constituent elements are not essential elements. The mobile terminal 20 may be embodied by more or less number of elements than the illustrated elements. For example, when the mobile terminal 20 is a tablet PC for a wireless internet use only, the mobile communication module 260 may be omitted.

The NFC module 210 performs NFC and may include an antenna (not illustrated) and an NFC chipset. The NFC chipset includes circuit elements to operate in the reader/writer mode 301, the P2P model 302, or the card emulation mode 303. When the NFC tag 30 is located within a coverage of an RF field in the reader/writer mode 301 (hereinafter, referred to as the NFC tagging), the NFC module 210 reads out tag information written to the NFC tag 30 (read mode) or writes or modifies predetermined information with respect to the NFC tag 30 (write mode). Also, when approaching the image forming apparatus 10 of FIG. 3A including the NFC chipset, the NFC module 210 may operate in the P2P mode 302 to perform bidirectional data communication. When operating in the card emulation mode 303, the NFC module 210 may operate similar to the NFC tag 30 of an active or passive type.

A read mode operation of the reader/writer mode 301 of the NFC module 210 according to an exemplary embodiment of the present general inventive concept is described below. The NFC module 210 obtains tag information of the NFC tag 30 through NFC tagging. The tag information of the NFC tag 30 includes information about the image forming apparatus 10. The tag information may include at least one of a first field including an application identifier, a second field including application installation information, a third field including a device identifier, a fourth field including a wireless connection authentication code, and a fifth field including a device model name. These fields are described below with reference to FIG. 8.

Figure 8:
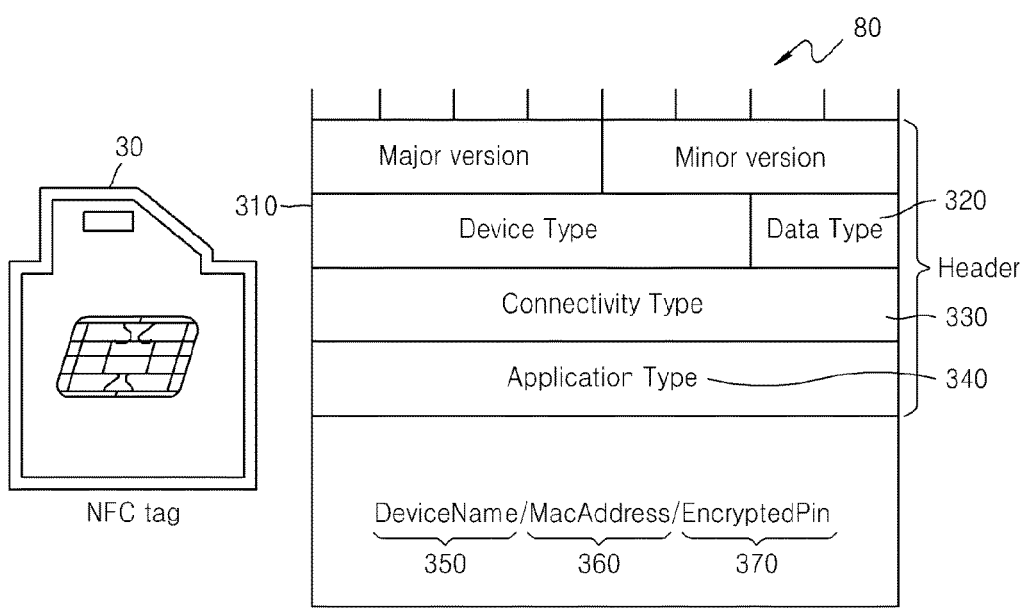
FIG. 8 schematically illustrates a data structure of an NFC tag according to an exemplary embodiment of the present general inventive concept.

FIG. 8 schematically illustrates a data structure 80 of the NFC tag 30 according to an exemplary embodiment of the present general inventive concept. The data structure 80 of the tag information written to the NFC tag 30 may vary according to the platform of the NFC tag 30. The number assigned to each field is used not to signify an order of written fields in the data structure 80, but only to distinguish the respective fields for the purposes of explanation. Also, one field may be divided into a plurality of sub-fields, or reversely one field may be formed by combining many fields. FIG. 8 illustrates at least a part of tag information written to the NFC tag 30, which is referred to herein as "tag information" for convenience of explanation. It will be understood, however, that the information included in the NFC tag 30 may include additional information beyond the fields illustrated in FIG. 8 and described herein.

Referring to FIG. 8, the data structure 80 of tag information includes a device type 310, an application type 340, DeviceName 350, MACAddress 360, and EncryptedPIN 370. The first field including an application identifier and the second field including application installation information are located in the application type 340. The third field including a device identifier is located in the MACAddress 360. The fourth field including a wireless connection authentication code is located in the EncryptedPIN 370. The fifth field including a device model name is included in the DeviceName 350. A sixth field including device capability information of the image forming apparatus 10 may be located in the device type 310. The device capability information may include, for example, "Print Capability: Color, Mono", "Scan Capability: 300,600 DPI", "FAX Capability: 33.6K bps", etc. A seventh field including information such as a wireless connection type of the image forming apparatus 10, for example, information about a Wi-Fi/Wi-Fi-Direct interface, may include a connectivity type 330. In addition, the data structure 80 may include additional fields, such as a Data Type field 320, and/or fields including a serial number or IP address of an image forming apparatus (not illustrated).

According to the platform of Android mobile operating system (OS), the application identifier in the first field may be for example "App ID: application/vnd.samsung.mobile-Print", the application installation information in the second field may be for example "Type Information: android.com: pkg // Package Name: com.sec.print.mobileprint", but the present general inventive concept is not limited thereto. The device identifier in the third field may be a MAC address of the image forming apparatus 10 and the wireless connection authentication code in the fourth field may be an encrypted authentication code (PIN) for Wi-Fi/Wi-Fi-Direct connection. The device model name in the fifth field may be a model number assigned by a manufacturer of the image forming apparatus 10.

The information about the data structure 80 of the tag information of FIG. 8 may be previously stored in the mobile terminal 20. For example, a mobile application 2502 stored in the storage unit 250 may include a tag manager 511 (illustrated in FIG. 5). The tag manager 511 may previously store the information about the data structure 880. The tag manager 511 parses or writes tag information referring to the data structure 80 stored in a read mode or a write mode.

Returning to FIG. 4, the NFC module 210 may be switched from the read mode to the write mode according to a request of the control unit 240. When the NFC tag 30 is detected through an NFC tagging operating in the write mode, the NFC module 210 writes or modifies tag information with respect to the NFC tag 30 according to the control of the control unit 240. The tag information is written to the NFC tag 30 referring to information about the data structure 80. The operations of the NFC module 210 in the read mode and the write mode will be described in detail later.

The wireless communication module 220 establishes a wireless connection with the image forming apparatus 10 and exchanges with the image forming apparatus 10 data needed to form an image that will be described later. Wireless connection signaling and response signaling between the wireless communication module 220 and the image forming apparatus 10 will be described below. The wireless connection may be Wi-Fi or Wi-Fi-direct, but the present general inventive concept is not limited thereto. Unless specified otherwise, the term "Wi-Fi" as used herein is interpreted to include Wi-Fi-direct.

First, in a Wi-Fi-direct connection process between the wireless communication module 220 and the image forming apparatus 10, the wireless communication module 220 discovers candidate devices (not illustrated) capable of Wi-Fi-direct connection. The wireless communication module 220 collects information such as a MAC address, a device type, service set identifier (SSID), etc., of the candidate devices through a probe request and a probe response that are wireless LAN packets.

The wireless communication module 220 tries Wi-Fi-direct connection with the image forming apparatus 10 that is selected among the candidate devices, at the request of the control unit 240. A group formation process and an authentication process for a secure connection are performed between the wireless communication module 220 and the image forming apparatus 10. The group formation signifies to determine that a certain device becomes a group owner (GO) or a certain device becomes a client. The devices belong to a formed group and are securely connected to each other and a technology used therefore is Wi-Fi protected setup (WPS). The WPS technology is divided into a personal identification number (PIN) method and a push button configuration (PBC) method. The PIN method uses a preset PIN code for authentication. The PBC method performs authentication by pressing a hardware or soft button provided in a GO device. When authentication is successful, the image forming apparatus 10 that is GO assigns an internet protocol (IP) address to the mobile terminal 20.

The wireless communication module 220 requests device capability information by transmitting a get device capability message to the image forming apparatus 10 at an IP address assigned by the image forming apparatus 10. The wireless communication module 220 receives information such as equipment of a print/scan/fax function, possibility of color/mono printing, PCL language in use, duplex/simplex printing, etc. from the image forming apparatus 10, but the present general inventive concept is not limited thereto. Accordingly, the Wi-Fi-direct connection between the image forming apparatus 10 and the mobile terminal 20 is established through the above processes.

For Wi-Fi connection, not Wi-Fi-direct, the wireless communication module 220 may belong to the same infra network with the image forming apparatus 10 through AP (802.11 b/g/n). The image forming apparatus 10 may permit access for devices existing in the same infra network, a device having a particular IP, a device having a particular MAC, or a device having an account in the image forming apparatus 10. When the wireless communication module 220 requests data transmission to an IP address of the image forming apparatus 10 from an AP, the AP relays the data transmission to the image forming apparatus 10 by referring to an ARP table.

According to the present exemplary embodiment of the present general inventive concept, the wireless connection process between the mobile terminal 20 and the may be automated by using the tag information of the NFC tag 30. In a state in which the connection between the mobile terminal 20 and the image forming apparatus 10 is not established, as the mobile terminal 20 performs NFC tagging with the NFC tag 30 (read mode), the wireless communication module 220 discovers candidate devices at the request of the control unit 240. The wireless communication module 220 automatically selects the image forming apparatus 10 among the candidate devices through a value of the third field (device identifier) of the tag information. When the device identifier is a MAC address, the wireless communication module 220 establishes a wireless connection with the image forming apparatus 10 having the MAC address obtained from the NFC tag 30 among the discovered candidate devices. In particular, the wireless communication module 220 automatically performs authentication by transmitting a value of the fourth field (authentication code) of the tag information to the image forming apparatus 10 so that a wireless connection may be established without inputting a PIN value to the mobile terminal 20 or pressing a WPS button (not illustrated) of the image forming apparatus 10.

The wireless communication module 220 may transmit data of a job to be done by the image forming apparatus 10 or receive a result of a finished job from the image forming apparatus 10. The data of a job may be, for example, a print command of the PCL language and print data of the PDL language. Also, the data of a job may be a scan command or a fax command. The result of a finished job may signify data, for example, a scanned document, a fax transmission result, etc. However, the present general inventive concept is not limited thereto.

The wireless communication module 220 may set the image forming apparatus 10 by transceiving firmware (FW) update data of the image forming apparatus 10 or accessing a webpage provided by the image forming apparatus 10 itself.

The mobile communication module 260 may communicate data needed for mobile communication by connecting to a circuit switched network and a packet switched network and may download a predetermined application through the packet switched network.

The user interface unit 230 may be a touch screen to display information processed by the mobile terminal 20 and receiving a user input. The user interface unit 230 may be configured diversely according to a product, for example, simply in a form of 2 or 4 lines on a display such as an LCD or LED display or by a graphic user interface (GUI) to enable various graphical presentations. The user interface unit 230 may include a touch sensor (not illustrated) to detect a user's gestures, specifically a user's touch. The user interface unit 230 may be embodied by a tactile sensor or a proximity sensor as a sensor to detect a touch. A tactile sensor signifies a sensor to detect a contact of a particular object with a sensitivity equal to or greater than a human's ability to detect a touch. The tactile sensor may detect various pieces of information such as a roughness of a contact surface, a rigidness of a contact object, a temperature of a contact position, etc. A proximity sensor signifies a sensor that detects an object approaching a predetermined detection surface or existence of an object existing in the vicinity by using a force of an electromagnetic field or using an infrared ray. The proximity sensor may include, for example, a transmissive photoelectric sensor, a direct reflective photoelectric sensor, a mirror reflective photoelectric sensor, a high frequency oscillating proximity sensor, a capacitive proximity sensor, a magnetic proximity sensor, an infrared proximity sensor, etc.

The user interface unit 230 may also be embodied by a key pad, a dome switch, a jog wheel, a jog switch, a H/W button, etc. (not illustrated).

The storage unit 250 may store a program, such as a mobile OS 2501, to process and control the control unit 240 and perform a function to store input/output data. The control unit 240 may control the mobile terminal 20 by executing the mobile OS 2501. Also, a mobile printing application (hereinafter, referred to as the mobile application 2502) to use functions of printing, scanning, faxing, etc. of the image forming apparatus 10 may be stored in the storage unit 250. The mobile application 2502 may perform an image forming job such as printing, scanning, faxing, etc. in engagement with the image forming apparatus 10. When the mobile application 2502 is not installed, the mobile application 2502 may be automatically installed through NFC tagging that will be described later.

The storage unit 250 may include at least one type of storage media such as a flash memory type, a hard disk type, a multimedia card micro type, a card type memory, for example, an SD or XD memory, random access memory (RAM), static random access memory (SRAM), read-only memory (ROM), electrically erasable programmable read-only memory (EEPROM), programmable read-only memory (PROM), a magnetic memory, a magnetic disc, and an optical disc. The mobile terminal 20 may operate a web storage performing a storage function of the storage unit 250.

The control unit 240 typically controls the overall operation of the mobile terminal 20. For example, the control unit 240 performs controls and processes related to content capturing, voice call, data communication, video call, etc. The control unit 240 controls the NFC module 210, the wireless communication module 220, the mobile communication module 260, the user interface unit 230, and the storage unit 250 by executing the mobile OS 2501 and the mobile application 2502 stored in the storage unit 250. A detailed operation of the control unit 240 will be described with reference to FIG. 5.

Figure 5:
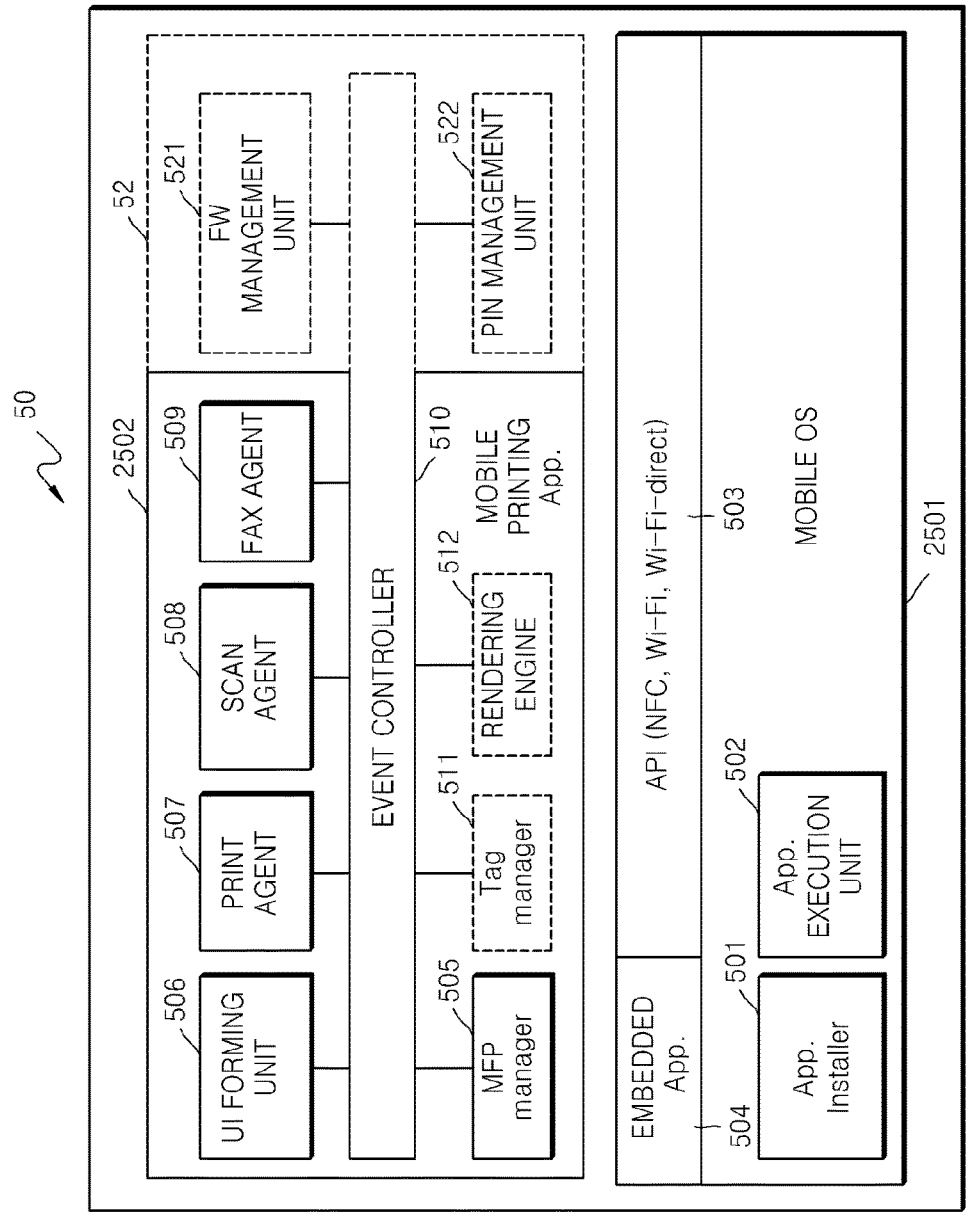
FIG. 5 is a block view schematically illustrating a software structure of a mobile terminal according to an exemplary embodiment of the present general inventive concept.

FIG. 5 schematically illustrates a plurality of software blocks 50 of the mobile terminal 20 according to an exemplary embodiment of the present general inventive concept. In FIG. 5, the software blocks 50 is functionally divided for convenience of explanation and may not necessarily form an independent program code unit. The software blocks 50 are stored in the storage unit 250 and processed according to a call of the control unit 240. Accordingly, the operation of each of the software blocks 50 may be understood as the operation of the control unit 240 even when there is no special description thereof.

Referring to FIG. 5, the mobile OS 2501 includes an application installer 501, an application execution unit 502, an embedded application 504, and an application programming interface (API) 503. When the mobile application 2502 is not installed, the application installer 501 executes an installation file of the mobile application 2502 to install the mobile application 2502 on the mobile terminal 20. Although the application installer 501 may be regarded as a sort of the embedded application 504, the application installer 501 is separately illustrated to prevent any confusion.

The application execution unit 502 executes the embedded application 504 or the mobile application 2502 according to the request of the mobile OS 2501 or the operation of the mobile terminal 20 by a user. The API 503 refers to a set of functions to interface with and operate the embedded application 504 or the mobile application 2502 on the mobile OS 2501. The API 503 may include an API for Wi-Fi or Wi-Fi-direct for NFC.

The embedded application 504 is a basic application that the mobile OS 2501 supports and may include, for example, a clock, a web browser, an address book, a camera, a file searcher, a document/image viewer, a music/moving picture player, voice/video calling software, etc. The embedded application 504 may include an application supporting an NFC function. In the following description, the embedded application 504 is assumed to be a predetermined application supporting the NFC function operating in the background in the mobile terminal 20.

The embedded application 504 operates the NFC module 210 in a read mode and reads out tag information of the NFC tag 30 through NFC tagging. The read tag information includes the value of the first field (application identifier) and the value of the second field (application installation information) as described above with reference to FIG. 8. The embedded application 504 provides the tag information read by the NFC module 210 to the mobile OS 2501 via the API 503.

The mobile OS 2501 determines whether an application corresponding to the value of the first field (application identifier) of the read tag information is installed on the mobile terminal 20. For example, the mobile OS 2501 may determine whether an application "samsung.mobilePrint" in "App ID: application/vnd.samsung.mobilePrint" is installed on the mobile terminal 20. If it is determined that an application corresponding to the "samsung.mobilePrint" is installed, the mobile OS 2501 executes a corresponding application through the application execution unit 502.

It is assumed that the application corresponding to the value of the first field (application identifier) is the mobile application 2502 and the mobile application 2502 is not yet installed on the mobile terminal 20.

In the process of installing the mobile application 2502 through the application installer 501 by the mobile OS 2501, the application installer 501 accesses a download page of the mobile application 2502 via the mobile communication module 260 or the wireless communication module 220. In doing so, if a user does not know the address of the download page, the user needs to discover the address of the download page. According to the present exemplary embodiment, however, the application installer 501 may access the download page by using the value of the second field (application installation information), for example, "Type Information: android.com:pkg // Package Name: com.sec.print.mobileprint", of the tag information. The application installer 501 downloads an installation file of the mobile application 2502 via the mobile communication module 260 or the wireless communication module 220. When the download is completed, the installation file is executed to install the mobile application 2502.

The mobile application 2502 includes a UI forming unit 506, a print agent 507, a scan agent 508, a fax agent 509, a multifunctional peripheral (MFP) manager 505, the tag manager 511, a rendering engine 512, a FW management unit 521, a PIN management unit 522, and an event controller 510. The blocks indicated by a dotted line may be omitted according to an exemplary embodiment. In particular, a manager package 52 may not be provided to general users. The manager package 52 may exist as a hidden function in the mobile application 2502 and may operate only in a manager mode. Similarly, the tag manager 511 may support only an NFC read mode for general users and may support an NFC tag write mode only in the manager mode.

Figure 15:
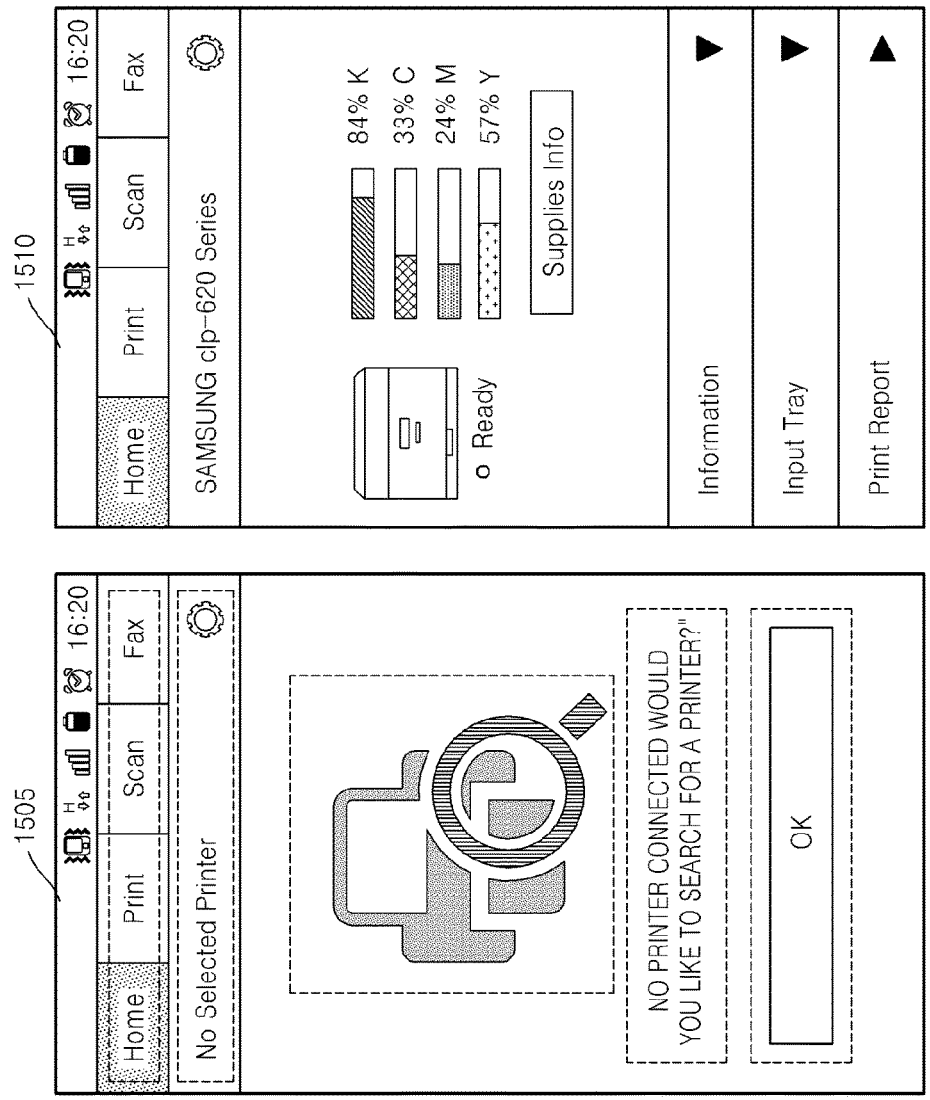
FIG. 15 illustrates an initial page of a mobile application according to an exemplary embodiment of the present general inventive concept.

The MFP manager 505 deals with the wireless connection and data communication with the image forming apparatus 10 through the wireless communication module 220. Also, the MFP manager 505 obtains status information of the image forming apparatus 10, for example, information about consumable supplies of the image forming apparatus 10, a state of a registered print job, normal operation/malfunction information, etc. When the mobile application 2502 is executed, the UI forming unit 506 forms an initial page that is initially displayed by the mobile application 2502 based on the information provided by the MFP manager 505. As illustrated in FIG. 15, a disconnected page 1505 is an initial page when the mobile application 2052 is executed in a state in which a wireless connection is not established with the image forming apparatus 10 and a connected page 1510 is an initial page when the mobile application 2052 is executed in a state in which a wireless connection is established with the image forming apparatus 10.

The print agent 507 provides a print function of the image forming apparatus 10 to the mobile terminal 20. The print agent 507 outputs a print job page to the mobile terminal 20 so that the mobile terminal 20 may use a print function of the image forming apparatus 10. A target content to be printed may be selected through the print job page and the selected content may be displayed in the print job page. The print job page may include a menu to set print details such as the number of print pages, double-sided/single-sided print, color/mono, a magnification ratio, and a paper size. The print agent 507 generates print job data according to the request of the event controller 510.

The rendering engine 512 renders a target content to be printed. In another exemplary embodiment of the present general inventive concept, the rendering engine 512 may be omitted and the original file of the target content to be printed may be provided to the image forming apparatus 10. In another exemplary embodiment, the mobile OS 2501 may include the rendering engine 512 and the mobile OS 2501 may provide a Print API to use the rendering engine 512 to the mobile application 2502.

The scan agent 508 and the fax agent 509 respectively provide a scan function and a fax function of the image forming apparatus 10 to the mobile terminal 20. The scan agent 508 and the fax agent 509 respectively output a scan job page and a fax job page so that the mobile terminal 20 may use the scan function and the fax function of the image forming apparatus 10. The scan job page and the fax job page may respectively include menus to set details of scanning and faxing. The scan agent 508 and the fax agent 509 respectively generate scan and fax job data according to the request of the event controller 510.

The UI forming unit 506 forms a GUI of the mobile application 2502. The UI forming unit 506 may form a GUI according to the model name or device capability of the image forming apparatus 10 that is wirelessly connected to the mobile terminal 20. For example, the UI forming unit 506 may form an image of the image forming apparatus 10 displayed on the connected page 1510 illustrated in FIG. 15 with an image corresponding to the model name of a device. Also, the UI forming unit 506 may form a GUI so as to activate only functions that the image forming apparatus 10 supports, among the menu items of "Home", "Print", "Scan", and "Fax".

The tag manager 511 writes tag information to the NFC tag 30 (write mode) or reads out tag information from the NFC tag 30 (read mode), via the NFC module 210. Before the execution of the mobile application 2502, the embedded application 504 calls an NFC API. After the mobile application 2502 is executed, the tag manager 511 calls the NFC API. Accordingly, when the mobile application 2502 is executed, a control right of the NFC module 210 passes from the embedded application 504 to the mobile application 2502.

Figure 14A:
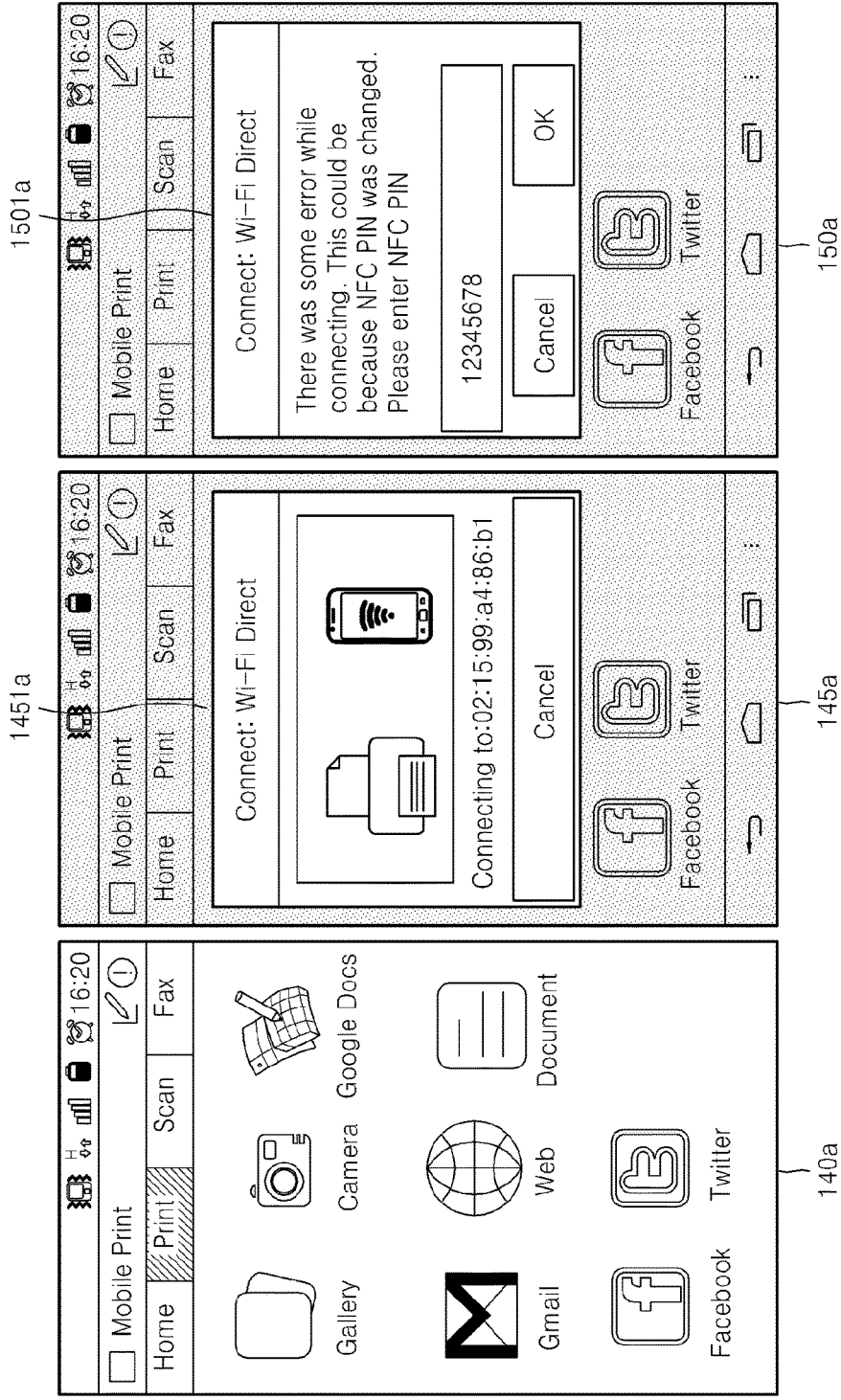

Whether the tag manager 511 operates in a write mode or read mode may be determined according to a user's selection. For example, when a write button 1401b illustrated in FIG. 14C is selected, the tag manager 511 may operate in a write mode. The write button 1401b may be provided only in a manager mode not in a general user mode of the mobile application 2502.

The FW management unit 521 obtains FW information of the image forming apparatus 10 through the wireless communication module 220 and determines whether FW update is needed. The FW management unit 521 accesses a FW providing server 70 (detailed below with reference to FIG. 7) via the wireless communication module 220 or the mobile communication module 260, provides at least one of the model name and the MAC address of the image forming apparatus 10, and requests FW update data. When the FW update data of the image forming apparatus 10 is received from the FW providing server 70, the FW of the image forming apparatus 10 is updated via the wireless communication module 220.

The PIN management unit 522 manages an authentication code for a wireless connection with the image forming apparatus 10. In a read mode, the value of the fourth field (authentication code) of tag information of the NFC tag 30 may be encrypted. The PIN management unit 522 may decode the encrypted authentication code.

In a write mode, a new authentication code input by a user is written to the NFC tag 30. The PIN management unit 522 may prove validation of data, that is, whether a value of the new authentication code input by a user has a valid format. For example, a new authentication code is proven by using a parity bit included in the input authentication code. Also, the PIN management unit 522 encrypts a new authentication code when the new authentication code is written to the NFC tag 30.

When the FW providing server 70 creates or manages an authentication code of the image forming apparatus 10, the PIN management unit 522 may obtain an authentication code of the image forming apparatus 10 from the FW providing server 70. Also, in another exemplary embodiment of the present general inventive concept, when an authentication code is included in the FW update data, the PIN management unit 522 may extract the authentication code.

The event controller 510 controls the overall operation of the mobile application 2502. The event controller 510 processes interrupts, NFC tagging, and user inputs occurring during the execution of the mobile application 2502 and generates a predetermined event according to a result of the process.

The event controller 510 may generate other events according to a current state of the mobile application 2502 when there is NFC tagging with the NFC tag 30 in a read mode. As used herein, "the state of the mobile application 2502" may signify a state of a GUI displaying the initial page, the print job page, the scan job page, or the fax job page. The event controller 510 may identify a page displayed during NFC tagging and execute an event mapped on the identified page. Also, the event controller 510 may determine whether the NFC tag 30 detected through NFC tagging is a tag of the image forming apparatus 10 connected to the mobile terminal 20. The tag of the image forming apparatus 10 may be physically separated from the image forming apparatus 10, but information about the image forming apparatus 10 is written, or will be written, to the tag so that the tag may support an image forming job between the mobile terminal 20 and the image forming apparatus 10.

Referring to FIG. 12, a list 1200 of events according to NFC tagging is provided. When a print job page is displayed during NFC tagging, the event controller 510 commands the rendering engine 512 to render a target content to be printed that is selected from the print job page and the print agent 507 to generate print job data including the rendered content and a print command. The event controller 510 transmits the generated print job data to the image forming apparatus 10 via the wireless communication module 220. Likewise, the event controller 510 may control the scan agent 508 and the fax agent 509 to generate scan job data or fax job data according to the page displayed during NFC tagging.

The event controller 510 establishes a wireless connection with the image forming apparatus 10 by using the obtained tag information when the disconnected page 1505 is displayed during NFC tagging in a read mode as illustrated in FIG. 15. Next, the event controller 510 obtains status information of the image forming apparatus 10 through the wireless connection to display the connected page 1510 illustrated in FIG. 15. The event controller 510 updates the displayed status information of the image forming apparatus 10 when the connected page 1510 is displayed during NFC tagging.

In the above description, the basic operation of the hardware elements and software blocks 50 of the mobile terminal 20 according to the present exemplary embodiment are described. In the following description, the operation of the mobile terminal 20 will be described in detail through the image forming method or the method of writing the NFC tag 30. In the descriptions of the methods, even when hardware elements and software blocks 50 are not described for each operation, one of ordinary skill in the art may understand from the above description which hardware element and/or which software block of the mobile terminal 20 is used for a corresponding operation.

Figure 9:
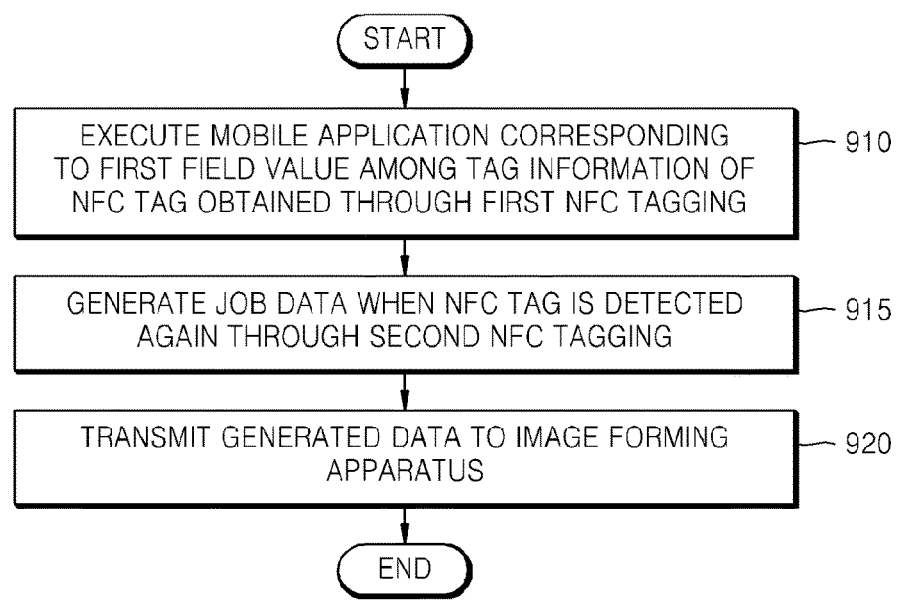
FIG. 9 is a flowchart describing an image forming method according to an exemplary embodiment of the present general inventive concept.

FIG. 9 is a flowchart describing an image forming method according to an exemplary embodiment of the present general inventive concept. The above descriptions may be referred to for the present exemplary embodiment.

First, the mobile terminal 20 executes the mobile application 2502 corresponding to the value of the first field value (application identifier) of the tag information of the NFC tag 30 obtained through first NFC tagging (operation 910). In other words, since the NFC module 210 of the mobile terminal 20 operates in a read mode, the tag information of the NFC tag 30 is obtained through the first NFC tagging. The control unit 240 executes the mobile application 2502 corresponding to the value of the first field (application identifier) of the tag information.

When the NFC tag 30 is detected again through second NFC tagging, the mobile terminal 20 generates data of a job to be performed by the image forming apparatus 10 through the mobile application 2502 (operation 915). In other words, since the NFC module 210 of the mobile terminal 20 continuously operates in a read mode, the same tag information is obtained again through the second NFC tagging. The job to be done may be determined according to a state of the mobile application 2502 during the second NFC tagging.

The mobile terminal 20 transmits data of a generated job to the image forming apparatus 10 (operation 920). The image forming apparatus 10 may then perform an image forming job such as printing, faxing, scanning, etc. according to data of a received job.

Figure 10:
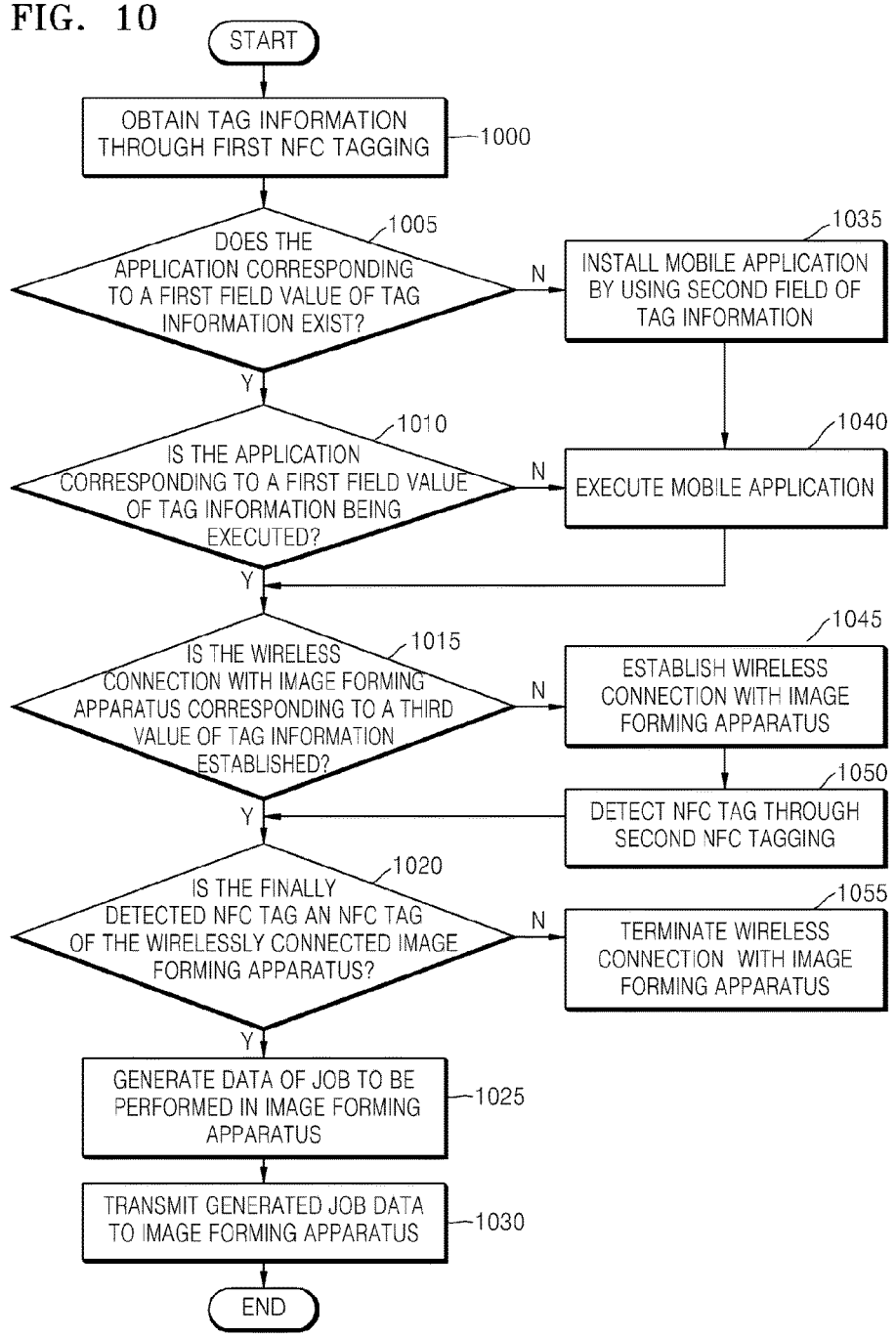
FIG. 10 is a flowchart describing an image forming method according to another exemplary embodiment of the present general inventive concept.

FIG. 10 is a flowchart describing an image forming method according to another exemplary embodiment of the present general inventive concept. The above descriptions may be referred to for the present exemplary embodiment.

The mobile terminal 20 obtains tag information of the NFC tag 30 through the first NFC tagging in a read mode (operation 1000). In operation 1000, it is assumed that the embedded application 504 is operated in the background on the mobile terminal 20 and the mobile application 2502 is not yet executed. The control unit 240 executes the embedded application 504 to obtain the tag information of the NFC tag 30 from the NFC module 210.

The mobile terminal 20 determines whether an application corresponding to the value of the first field (application identifier) of the tag information exists in the mobile terminal 20 (operation 1005). To perform this operation, the mobile terminal 20 first may parse the tag information. Referring to the data structure 80 illustrated in FIG. 8, the mobile terminal 20 may identify which area of the parsed tag information corresponds to the value of the first field (application identifier). According to an exemplary embodiment of the present general inventive concept, the mobile terminal 20 may extract the value of the first field (application identifier) by identifying the size and position of the first field with reference to the data structure 80. Also, according to another exemplary embodiment of the present general inventive concept, the value of the first field (application identifier) may be extracted by using a field name "APP ID" to identify a field. Other field values may be extracted from the tag information in a similar method to the value of the first field (application identifier).

The control unit 240 of the mobile terminal 20 determines whether there is an application corresponding to the value of the first field (application identifier), for example "samsung.mobilePrint", among the applications existing in the storing unit 250. The control unit 240 may perform the determination referring to an application list kept by the mobile OS 2501.

If it is determined that the application corresponding to the value of the first field (application identifier) does not exist in the mobile terminal 20 (operation 1005-N), the mobile terminal 20 installs the mobile application 2502 by using the value of the second field (application installation information) of the tag information (operation 1035).

The installation process of the mobile application 2502 will be described below with reference to FIG. 11. The above descriptions may be referred to for the present exemplary embodiment of the present general inventive concept.

Figure 11:
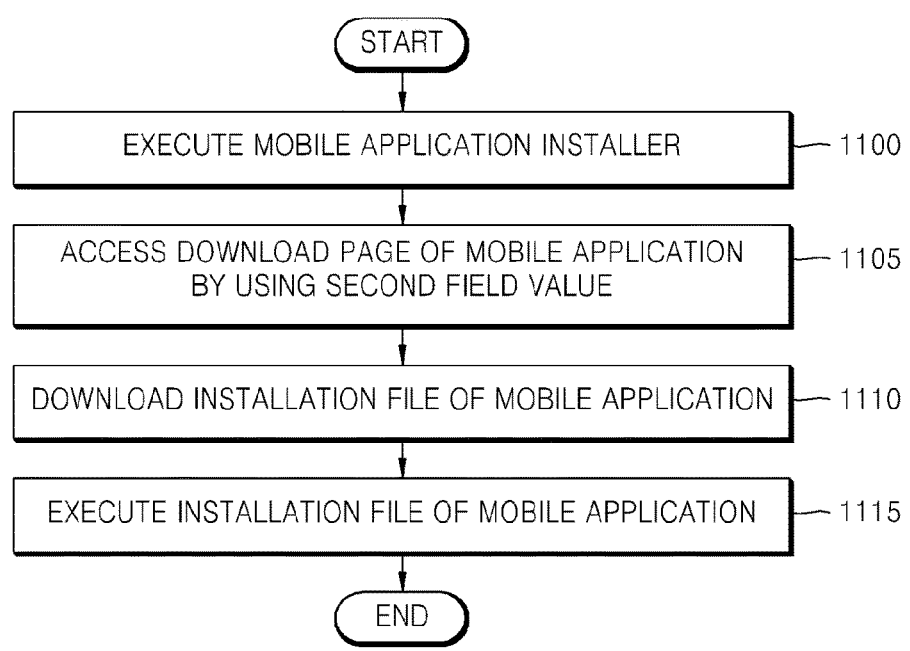
FIG. 11 is a flowchart describing an installation process of a mobile application according to an exemplary embodiment of the present general inventive concept.

With reference to FIG. 11, when it is determined that there is no application corresponding to the value of the first field (application identifier) of the tag information (operation 1005-N), the control unit 240 executes the application installer 501 of the mobile application 2502 through the mobile OS 2501 (operation 1100). The control unit 240 may execute the application installer 501 and simultaneously provide the value of the second field (application installation information) to the application installer 501.

The mobile terminal 20 accesses the download page of the mobile application 2502 by using the value of the second field (application installation information) (operation 1105). The control unit 240 operates the wireless communication module 220 or the mobile communication module 260 through the application installer 501. When wireless Internet is available through the wireless communication module 220, the wireless communication module 220 may be primarily operated over the mobile communication module 260. Since the application installer 501 can directly access the download page of an application by using the value of the second field (application installation information), for example, "Type Information: android.com:pkg // Package Name: com.sec.print.mobileprint", a user does not need to separately discover the mobile application 2502. The download page may provide general information about the mobile application 2502 and may include an installation button.

The mobile terminal 20 downloads an installation file of the mobile application 2502 (operation 1110). When a user selects an installation button on the download page, the control unit 240 controls the wireless communication module 220 or the mobile communication module 260 to download the installation file of the mobile application 2502 by using the application installer 501.

The mobile terminal 20 executes the installation file of the mobile application 2502 (operation 1115). In other words, the control unit 240 executes the installation file of the mobile application 2502 to install the mobile application 2502 on the storage unit 250.

Referring back to FIG. 10, when the installation of the mobile application 2502 is completed, the mobile terminal 20 executes the mobile application 2502 (operation 1040).

If instead it is determined in operation 1005 that an application corresponding to the value of the first field (application identifier) of the tag information exists (operation 1005-Y), the mobile terminal 20 determines whether the application corresponding to the value of the first field (application identifier) is being executed (operation 1010).

If the application corresponding to the value of the first field (application identifier) is not being executed (operation 1010-N), the mobile terminal 20 executes the mobile application 2502 corresponding to the value of the first field (application identifier) (operation 1040). For example, the control unit 240 executes the mobile application 2502 having the application identifier "samsung.mobilePrint" through the application execution unit 502.

Following operation 1040, or if it is determined that the application corresponding to the value of the first field is being executed (operation 1010-Y), the mobile terminal 20 determines whether the wireless connection with the image forming apparatus 10 corresponding to the value of the third field (device identifier) of the tag information is established (operation 1015). The establishment of a wireless connection with the image forming apparatus 10 may not require the execution of the mobile application 2502. For example, the mobile terminal 20 may establish a wireless connection with the image forming apparatus 10 through the mobile OS 2501 in a state in which the mobile application 2502 is not being executed.

The control unit 240 determines whether the wireless communication module 220 is wirelessly connected to another device. If the wireless communication module 220 is wirelessly connected to another device, the control unit 240 may determine whether a wireless connection with the image forming apparatus 10 is established, by comparing the MAC or IP address of the wirelessly connected device with the value of the third field (device identifier) of the tag information.

If it is determined in operation 1015 that the wireless connection with the image forming apparatus 10 corresponding to the value of the third field (device identifier) of the tag information is not established (operation 1015-N), the mobile terminal 20 establishes a wireless connection with the image forming apparatus 10 (operation 1045). According to this exemplary embodiment of the present general inventive concept, when there is the first NFC tagging, a wireless connection is established in operation 1045 after the mobile application 2502 is executed in operation 1040. Alternatively, when there is the first NFC tagging, the wireless connection with the image forming apparatus 10 may be first established and then the mobile application 2502 may be executed. Also, the wireless connection establishment process and the execution of the mobile application 2502 may be simultaneously performed. These modified exemplary embodiments may be interpreted to be equivalent to the exemplary embodiment of the present general inventive concept illustrated in FIG. 10.

Figure 13:
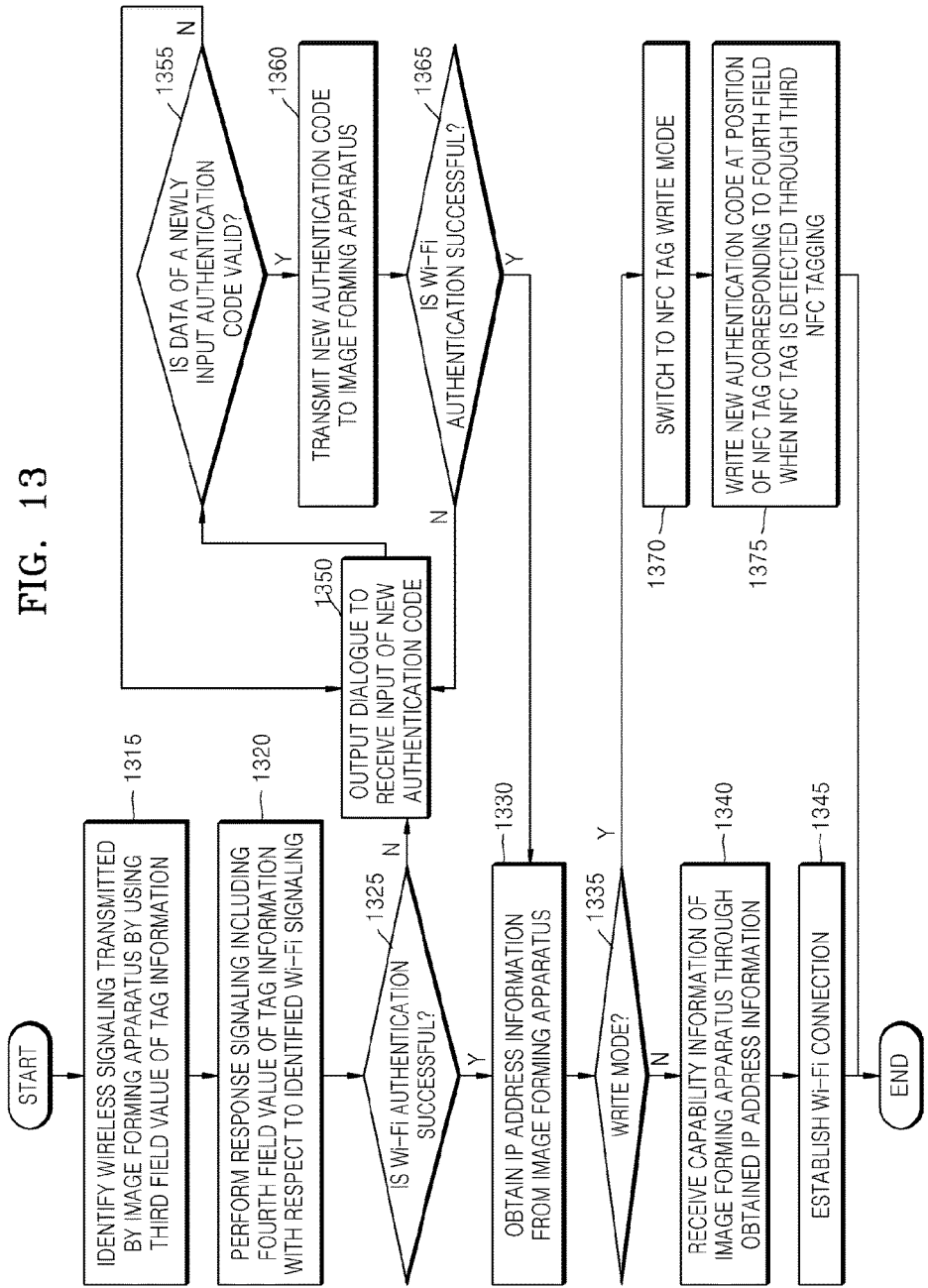
FIG. 13 is a flowchart describing a process of establishing a wireless connection between the mobile terminal and the image forming apparatus, according to an exemplary embodiment of the present general inventive concept.

FIG. 13 is a flowchart describing a process of establishing a wireless connection between the mobile terminal 20 and the image forming apparatus 10, according to an exemplary embodiment of the present general inventive concept. The wireless connection establishment process of FIG. 13 may be referred to in order to understand operation 1045 of FIG. 10. However, the wireless connection establishment process of FIG. 13 is not necessarily dependent on the exemplary embodiment of FIG. 10. The wireless connection establishment process of FIG. 13 may be performed independently of the exemplary embodiment of FIG. 10. The above descriptions may be referred to for the present exemplary embodiment.

Referring to FIG. 13, the mobile terminal 20 identifies wireless connection signaling of the image forming apparatus 10 or an AP connected to the image forming apparatus 10 by using the value of the third field (device identifier) of the tag information (operation 1315). The mobile terminal 20 performs device discovery and receives a signal that the image forming apparatus 10 transmits. The image forming apparatus 10 may be identified among candidate devices in an environment where a plurality of Wi-Fi or Wi-Fi-direct devices exist. According to a conventional method, the mobile terminal 20 summarizes and displays information collected from the candidate devices, such as an IP address, a MAC address, or a device model name for each candidate device. Next, when a user selects any one candidate device, the mobile terminal 20 tries to establish a wireless connection with a selected candidate device.

According to the present exemplary embodiment of the present general inventive concept, the mobile terminal 20 may identify the image forming apparatus 10 from the other candidate devices by using the value of the third field (device identifier) of the tag information. For example, for a Wi-Fi-direct connection, the wireless connection signaling of the image forming apparatus 10 may be identified by selecting a candidate device having a MAC address obtained from the NFC tag 30. When the value of the third field (device identifier) is a MAC address or an IP address, the mobile terminal 20 may identify a Wi-Fi-direct signal transmitted by the image forming apparatus 10 having the same MAC address as the value of the third field (device identifier), among the discovered Wi-Fi-direct candidate devices. For a Wi-Fi connection, not the Wi-Fi-direct connection, the mobile terminal 20 may having a Wi-Fi connection with the image forming apparatus 10 via an AP (802.11 b/g/n) by using the value of the third field (device identifier) among Wi-Fi candidate devices connected to the AP (802.11 b/g/n). The mobile terminal 20 may obtain information about a MAC address or an IP address of the candidate devices from the AP (802.11 b/g/n) and may identify whether the image forming apparatus 10 having the same MAC address or IP address as the value of the third field (device identifier) exists in the AP (802.11 b/g/n).

The mobile terminal 20 may identify signaling of the image forming apparatus 10 or the AP (802.11 b/g/n) by using the value of the fifth field (device model name) with the value of the third field (device identifier) of the tag information. The mobile terminal 20 performs response signaling to the identified wireless connection signaling (operation 1320). In other words, the control unit 240 of the mobile terminal 20 performs response signaling through the wireless communication module 220. The mobile terminal 20 may perform authentication needed for the wireless connection with the image forming apparatus 10 through the response signaling. The mobile terminal 20 performs WPS authentication with the image forming apparatus 10 by transmitting the value of the fourth field (authentication code) of the tag information to the image forming apparatus 10. The image forming apparatus 10 performs WPS authentication by comparing the PIN value set in FW of the image forming apparatus 10 with the authentication code received from the mobile terminal 20.

Accordingly, even when a user does not directly input the PIN or press the WPS button of the image forming apparatus 10, the authentication needed for the wireless connection with the image forming apparatus 10 may be automatically performed. The fourth field (authentication code) may be encrypted in a predetermined method. The mobile terminal 20 may decode the encrypted authentication code. For the Wi-Fi connection, not the Wi-Fi-direct connection, authentication with AP (802.11 b/g/n) may be performed for the wireless connection to the AP (802.11 b/g/n).

The mobile terminal 20 determines whether the authentication using the fourth field (authentication code) is successful by receiving an authentication success message or authentication failure message (operation 1325). When authentication is successful (operation 1325-Y), IP address information for the Wi-Fi-direct connection from the image forming apparatus 10 is obtained (operation 1330). For the Wi-Fi connection, not the Wi-Fi-direct connection, the AP (802.11 b/g/n) assigns an IP address to the mobile terminal 20.

The mobile terminal 20 obtains device capability information of the image forming apparatus 10 by using the obtained IP address information (operation 1340). The control unit 240 of the mobile terminal 20 transmits a message "get device capability" requesting information about the device capability through the obtained IP address. Next, the mobile terminal 20 obtains the device capability information as a response message, for example, equipment of print/scan/fax functions, possibility of color/mono printing, PCL language in use, duplex/simplex printing, etc., but the present general inventive concept is not limited thereto. Next, the mobile terminal 20 completes the establishment of a wireless connection (operation 1345).

In operation 1325, if the wireless connection authentication through the value of the third field (device identifier) of the tag information fails (operation 1325-N), the mobile terminal 20 outputs a dialog to receive an input of a new authentication code (operation 1350). In other words, the control unit 240 displays a dialog to receive an input of a new authentication code on the user interface unit 230. For example, a dialog 1501a is displayed on a GUI 150a as illustrated in FIG. 14A. The mobile terminal 20 receives an input of a new authentication code through the dialog 1501a. A method of obtaining a new authentication code by a user includes a variety of exemplary embodiments of the present general inventive concept, for example, a method of obtaining a new authentication code from the image forming apparatus 10, a method of obtaining a new authentication code from the FW providing server 70, etc., which will be described in detail later.

In the operation of outputting the dialog 1501a, the dialog 1501a may be output only when the mobile application 2502 operates in a manager mode. For example, only an authentication failure message may be output in the mobile application 2502 for general users.

The mobile terminal 20 proves validity of data of a newly input authentication code (operation 1355). An authentication code may be created according to a particular rule. To determine whether the rule is satisfied, for example, the last bit of an authentication code may be a parity code. Accordingly, the mobile terminal 20 may determine whether a new authentication code input by a user satisfies a predetermined creation rule, by using the parity bit included in the authentication code. The control unit 240 may prove validity of data of a new authentication code through the PIN management unit 522.

The mobile terminal 20 returns to operation 1350 if the newly input authentication code has no data validity (operation 1355-N). A message to indicate that there is an error in the format of an authentication code may be displayed.

If the new authentication code is proven to be valid (operation 1355-Y), the mobile terminal 20 transmits the new authentication codes to the image forming apparatus 10 and performs again wireless connection authentication (operation 1360). For the Wi-Fi connection, not the Wi-Fi-direct connection, one of ordinary skill in the art may understand that authentication is performed with the AP (802.11 b/g/n).

If the authentication for a wireless connection fails (operation 1365-N), the mobile terminal 20 returns to operation 1350. If the authentication for a wireless connection is successful (operation 1365-Y), the mobile terminal 20 goes to the above-described operation 1330. In doing so, the mobile terminal 20 may write a successful authentication code to the NFC tag 30. For example, a dialog 1551a may be displayed on a GUI 155a of FIG. 14B. In other words, the dialog 1551a to receive an input of whether to write a correct authentication code value to the NFC tag 30 may be displayed (operation 1335).

If the user selects "Cancel" in the dialog 1551a (operation 1335-N), the mobile terminal 20 may continuously maintain a read mode without being switched to a write mode. If the user selects "OK" in the dialog 1551a (operation 1335-Y), the mobile terminal 20 is switched from the read mode to the write mode (operation 1370). In the present exemplary embodiment, the mobile terminal 20 is switched to the write mode according to an input value. In another exemplary embodiment of the present general inventive concept, the mobile terminal 20 may be instantly switched to the write mode without displaying the dialog 1551a.

In other words, when receiving an authentication success message through the wireless communication module 220, the control unit 240 of the mobile terminal 20 switches the operation mode of the NFC module 210 from the read mode to the write mode through the tag manager 511. When being switched to the write mode and prepared to write to the NFC tag 30, the mobile terminal 20 may output a GUI 160a of FIG. 14B to guide NFC tagging.

When the mobile terminal 20 is detected through third NFC tagging, the mobile terminal 20 writes a new authentication code at a position of the NFC tag 30 where the value of the fourth field (authentication code) is written (operation 1375). In other words, the control unit 240 of the mobile terminal 20 referring to the data structure 80 identifies at which position of the NFC tag 30 the fourth field is written and writes a correct authentication code at the identified position through the NFC module 210.

According to the present exemplary embodiment of the present general inventive concept, the mobile terminal 20 may determine whether the detected NFC tag 30 is the tag of the image forming apparatus 10 through the third NFC tagging. The method of determining whether it is the tag of the image forming apparatus 10 will be described later.

If the NFC tag 30 detected through the third NFC tagging is determined to be the tag of the image forming apparatus 10, the mobile terminal 20 may write the new authentication code to the NFC tag 30. Otherwise, the mobile terminal 20 may not perform the writing.

Figure 14B:
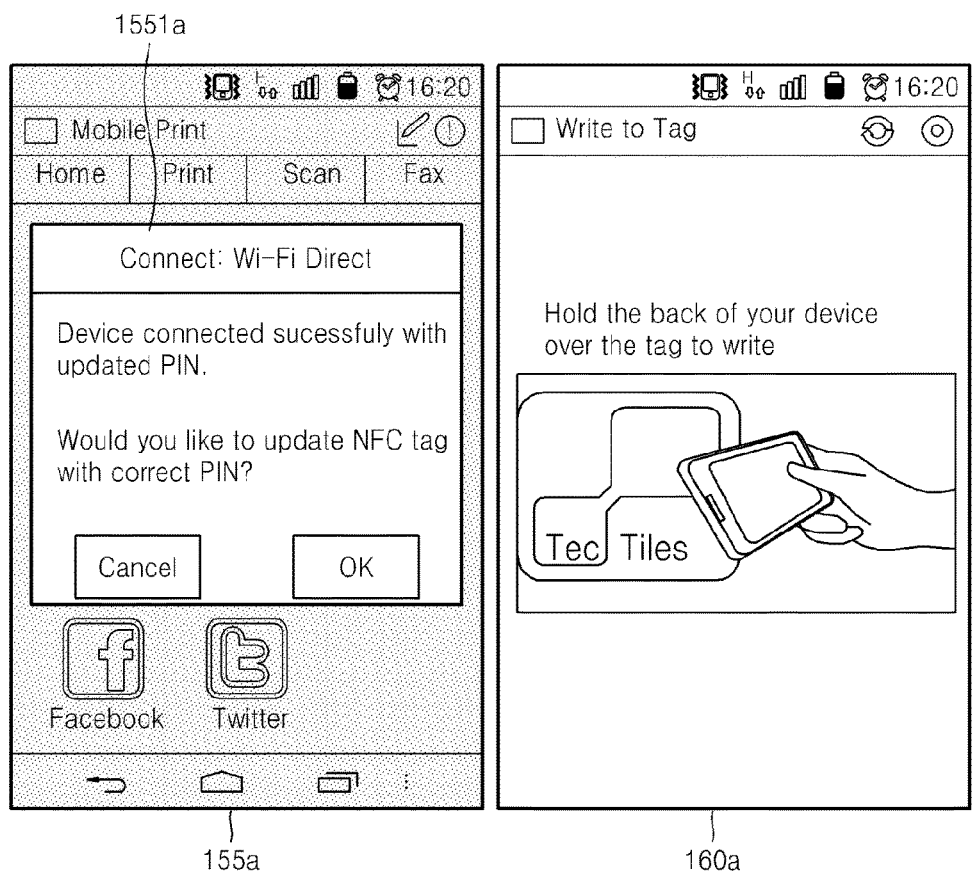
Figure 14C:
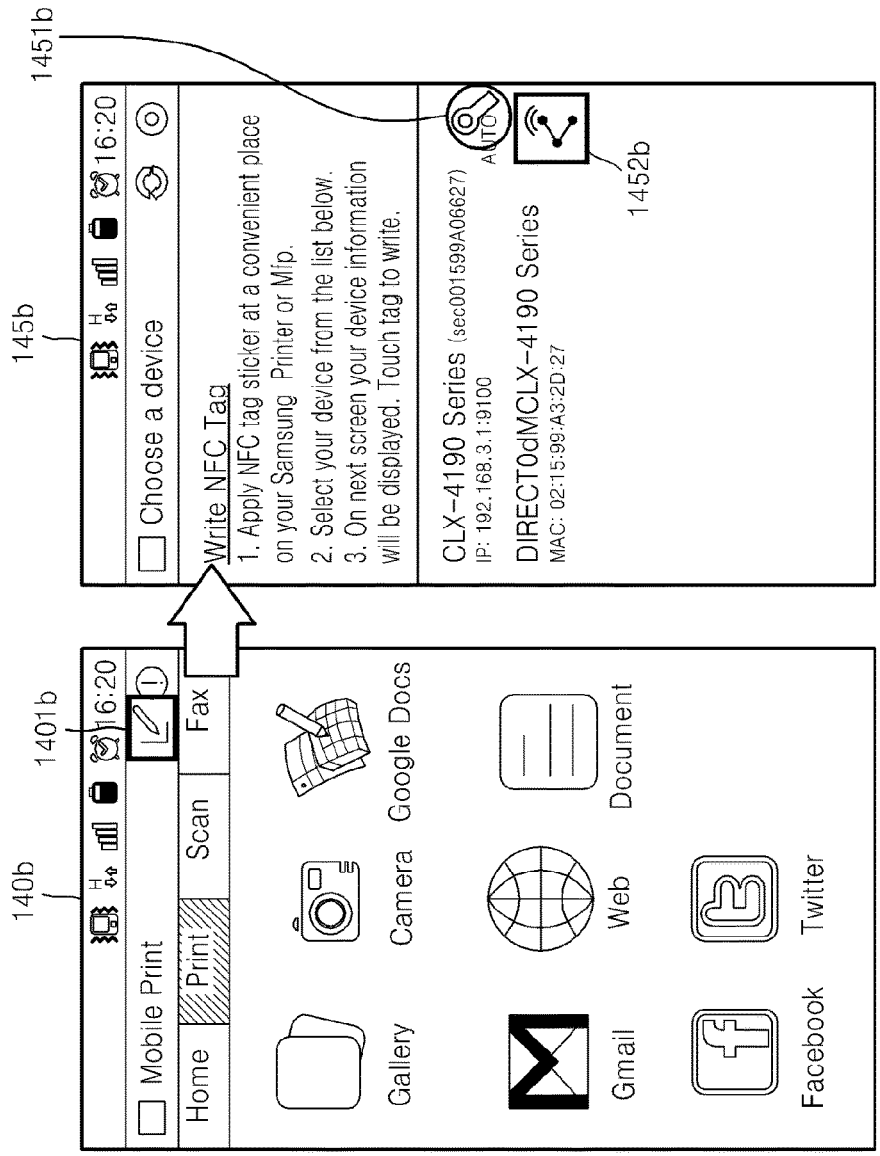

FIGS. 14A and 14B illustrate GUIs of the mobile terminal 20 when the value of the fourth field (authentication code) of the NFC tag 30 is corrected. First, a user executes the mobile application 2502 on the mobile terminal 20. The print job page of the mobile application 2502 is the same as a GUI 140a.

When the NFC tag 30 is detected through the NFC tagging, the mobile terminal 20 transmits the value of the fourth field (authentication code) of the tag information to the image forming apparatus 10 in order to establish a wireless connection with the image forming apparatus 10. A GUI 145a indicates a state in which the mobile terminal 20 tries a wireless connection with the image forming apparatus 10, and informs the user of its progress with a dialog 1451a.

If the mobile terminal 20 fails to authenticate the wireless connection, the dialog 1501a of FIG. 14A is output to receive an input of a new authentication code. After the new authentication code is input and the connection is authenticated, the mobile device 20 may display GUI 155a, illustrated in FIG. 14B, and a dialog 1551a informs the user of the successful connection and prompts the user to write the new authentication code to the NFC tag 30. If a user desires to write the new authentication code value to the NFC tag 30, the user selects the OK button on the dialog 1551a. When the OK button is selected, the mobile terminal 20 is switched to the write mode and outputs the GUI 160a to guide the user through NFC tagging.

Referring back to FIG. 10, when the establishment of a wireless connection with the image forming apparatus 10 is completed through operation 1045, the control unit 240 of the mobile terminal 20 maintains the NFC module 210 in the read mode. When the connection between the mobile terminal 20 and the image forming apparatus 10 is completed, the connected page 1510 illustrated in FIG. 15 may be output. An image corresponding to the device model name of the image forming apparatus 10 is displayed on the connected page 1510. Also, status information of the image forming apparatus 10, for example, information about the remaining amount of an ink cartridge or toner, may be displayed on the connected page 1510. The mobile terminal 20 may configure the connected page 1510 by obtaining the status information of the image forming apparatus 10 through the wireless connection.

Only the print, scan, and fax menus corresponding to the device capability of the image forming apparatus 10 may be activated in the mobile application 2502. The device capability may be obtained not only through the NFC tagging but also through the wireless connection establishment process.

A user may select any one of the print, scan, and fax menus by manipulating the mobile terminal 20. The GUI 140a of FIG. 14A illustrates a print job page. Icons such as "gallery", "camera", etc. are displayed on the print job page. An image stored in the mobile terminal 20 may be selected through the "gallery" icon. If the "gallery" icon is selected, the print job page may be switched to a subpage. For convenience of explanation, the print job page is defined to refer to both of an upper-level page and a subpage, i.e. the first page and the second page accessed through the first page, for example, by selecting an icon displayed on the first page.

If a scan or fax menu, not a print menu, is selected at the connected page 1510, a scan job page or a fax job page is displayed.

Returning to FIG. 10, after operation 1045, the mobile terminal 20 detects the NFC tag 30 through the second NFC tagging (operation 1050). In this case, since the NFC module 210 operates as a read mode, the tag information may be re-read out from the NFC tag 30.

After detecting the NFC tag through the second NFC tagging (operation 1050) or determining that the wireless connection with the image forming apparatus 10 corresponding to the value of the third field of the tag information is established (operation 1015-Y), the mobile terminal 20 determines whether the NFC tag 30 that is finally detected is the tag of the image forming apparatus 10 (operation 1020). If the mobile application 2502 is already executed and the wireless connection with the image forming apparatus 10 is already established, during the first NFC tagging, the mobile terminal 20 determines whether the NFC tag 30 detected by the first NFC tagging is the tag of the image forming apparatus 10. Unlike the above, when there is the second NFC tagging of operation 1050, the mobile terminal 20 determines whether the NFC tag 30 detected by the second NFC tagging is the tag of the image forming apparatus 10.

In order to determine whether an NFC tag 30 is the tag of the image forming apparatus 10, the mobile terminal 20 uses the tag information obtained from the NFC tag 30. For example, if both of the first NFC tagging and the second NFC tagging have been performed, the tag information obtained by the first NFC tagging and the tag information obtained by the second NFC tagging are compared with each other and it is determined whether both of the tag information match each other. In doing so, only a part of the tag information may be compared.

According to another exemplary embodiment of the present general inventive concept, the mobile terminal 20 may compare the tag information of the tag that is finally detected with the information of the image forming apparatus 10 that is wirelessly connected, so as to determine whether it is the tag of the image forming apparatus 10. The mobile terminal 20 may have already collected device information, for example a MAC address or an IP address, a model name, a wireless connection method, etc. of the image forming apparatus 10 in the wireless connection establishment process with the image forming apparatus 10, or may identify the device information from the image forming apparatus 10 through the wireless connection. Accordingly, the mobile terminal 20 may check whether the NFC tag 30 is the tag of the image forming apparatus 10 by comparing the device information of the image forming apparatus 10 that is wirelessly connected with at least one of the value of the third field (device identifier), the value of the fourth field (authentication code), the value of the fifth field (device model name), the value of the sixth field (device capability), and the value of the seventh field (wireless connection type) of the tag information.

The mobile terminal 20 may check an object that calls NFC API during the second NFC tagging. If the mobile terminal 20 executes mobile application 2502 and another application to multitask, the mobile terminal 20 may check whether the object that calls NFC API during the second NFC tagging is the mobile application 2502.

If it is determined in operation 1020 that the NFC tag 30 is not the tag of the image forming apparatus 10 (operation 1020-N), the mobile terminal 20 may terminate the wireless connection with the image forming apparatus 10 (operation 1055). In other words, if the NFC tag 30 detected through the second NFC tagging is a tag of another image forming apparatus (not illustrated), the wireless connection with the image forming apparatus 10 is terminated and a wireless connection with the other image forming apparatus may be established. The mobile terminal 20 may display a message to notice a change of a wireless connection target.

If it is determined in operation 1020 that the NFC tag 30 is the tag of the image forming apparatus 10 (operation 1020-Y), the mobile terminal 20 generates data of a job to be performed by the image forming apparatus 10 (operation 1025). The job to be performed may be determined according to the state of the mobile application 2502 during the final NFC tagging. In the following description, the final NFC tagging is assumed to be the second NFC tagging. The state of the mobile application 2502 may be a state in which an initial page, a print job page, a scan job page, or a fax job page is displayed, that is, a state of a GUI. The mobile terminal 20 identifies a page of the mobile application 2502 displayed on the mobile terminal 20 during the second NFC tagging and executes an event mapped on the identified page. The mapped event may be deformed according to an exemplary embodiment of the present general inventive concept and FIG. 12 illustrates examples of events mapped on the respective pages.

Figure 16A:
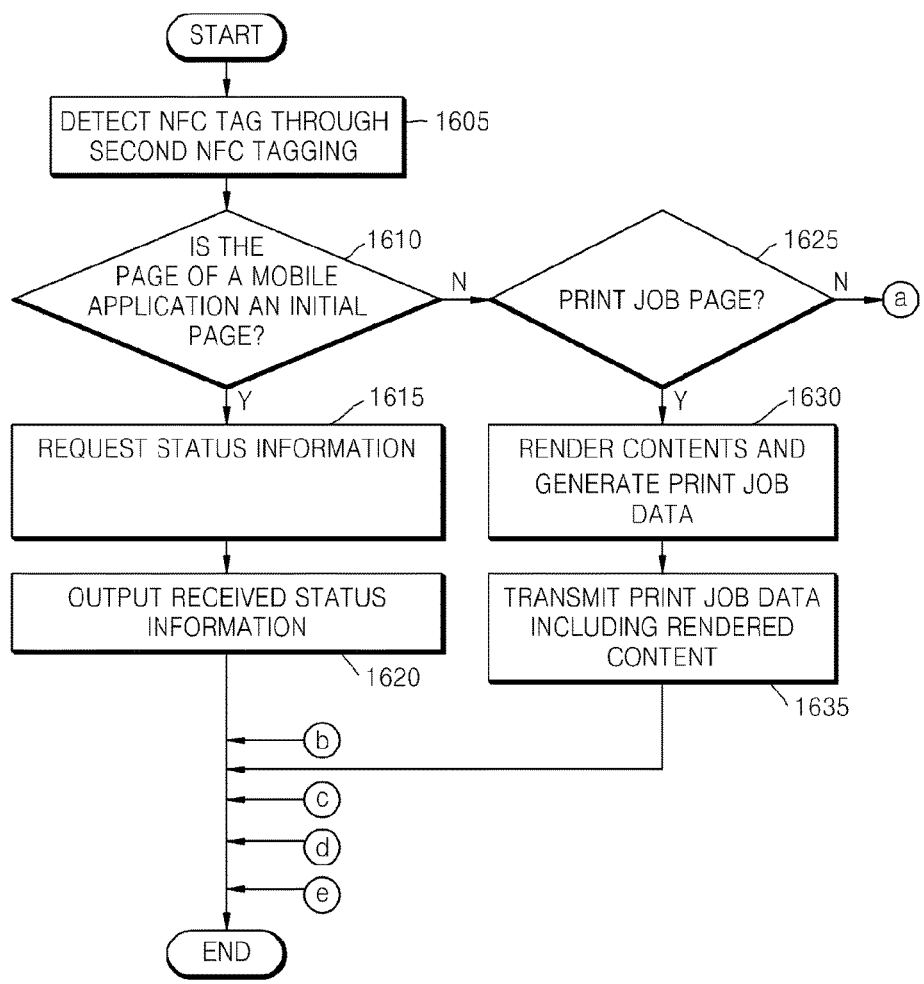
FIGS. 16A and 16B are flowcharts describing an operation according to a mobile application, according to an exemplary embodiment of the present general inventive concept.
Figure 16B:
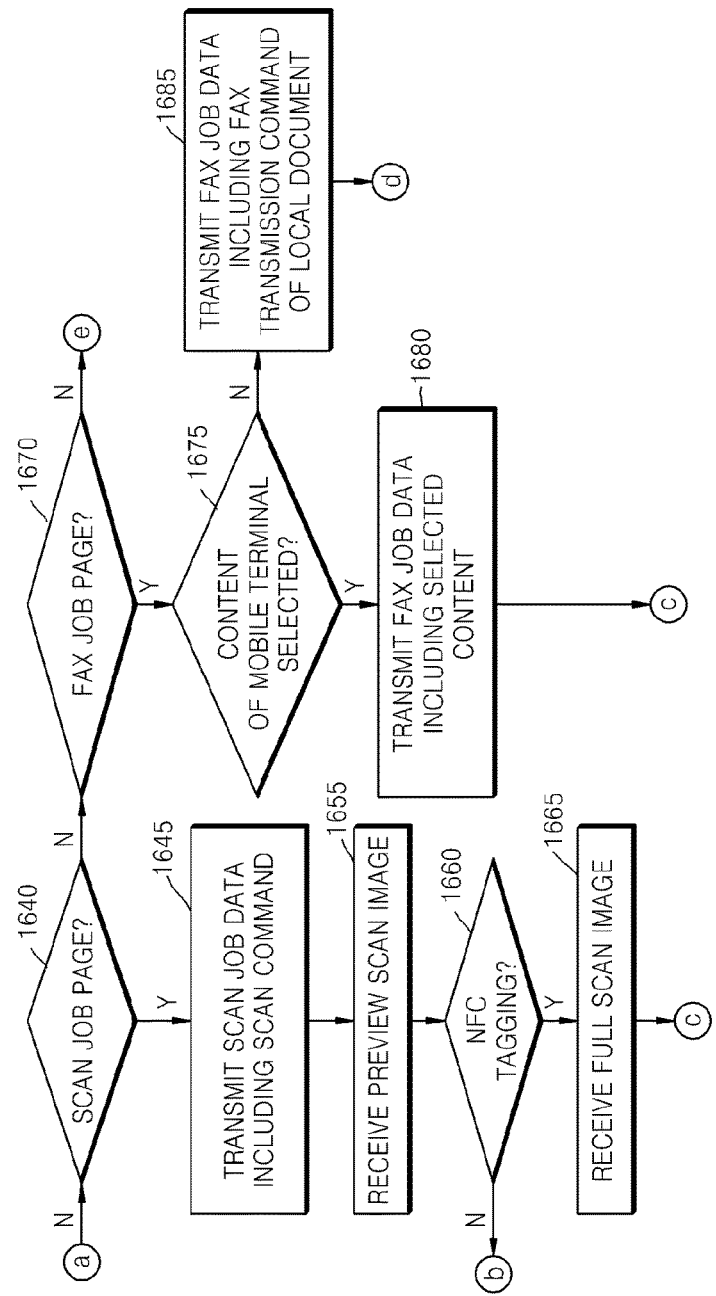

FIGS. 16A and 16B are flowcharts describing an operation according to the mobile application 2502, according to an exemplary embodiment of the present general inventive concept. The above descriptions may be referred to for the present exemplary embodiment. In FIGS. 16A and B, it is assumed that the mobile application 2502 is executed and the wireless connection with the image forming apparatus 10 is established.

Referring to FIG. 16A, the mobile terminal 20 detects an NFC tag 30 through the second NFC tagging (operation 1605). The mobile terminal 20 determines whether a page of the mobile application 2502 is an initial page during the second NFC tagging (operation 1610). If the page of the mobile application 2502 is an initial page, the mobile terminal 20 requests status information from the image forming apparatus 10 (operation 1615). The status information may signify information displayed on the connected page 1510 of FIG. 15. If the initial page of the mobile application 2502 already displays the status information, the second NFC tagging may be understood to be an update of the status information. The mobile terminal 20 receives the status information from the image forming apparatus 10 through the wireless connection and displays the received status information on the mobile terminal 20 (operation 1620).

If the page of the mobile application 2502 is not determined to be an initial page during the second NFC tagging (operation 1610-N), the mobile terminal 20 determines whether the page of the mobile application 2502 is a print job page (operation 1625). If the page of the mobile application 2502 is determined to be a print job page (operation 1625-Y), the mobile terminal 20 renders a content selected from the print job page and generates print job data (operation 1630). The mobile terminal 20 transmits the print job data including the rendered content to the image forming apparatus 10 (operation 1635).

With reference to FIG. 16B, if the page of the mobile application 2502 is not determined to be the print job page during the second NFC tagging (operation 1625-N), the mobile terminal 20 determines whether the page of the mobile application 2502 is a scan job page (operation 1640). If the page of the mobile application 2502 is determined to be a scan job page (operation 1640-Y), the mobile terminal 20 generates a scan command according to detailed settings set on the scan job page, for example, a scan size, a resolution, etc. and transmits scan job data including the scan command to the image forming apparatus 10 (operation 1645). The image forming apparatus 10 may scan a document according to the scan job data and transmit the scanned document to the mobile terminal 20 through the wireless connection. The image forming apparatus 10 may quickly scan an image by lowering a scan resolution and provide a preview scan image which is received at the mobile terminal 20 (operation 1655). A user of the mobile terminal 20 may check the preview scan image. When the NFC tag 30 is detected again through the NFC tagging (operation 1660-Y), the mobile terminal 20 requests a full scan image from the image forming apparatus 10. The image forming apparatus 10 generates a full scan image and transmits the generated full scan image to the mobile terminal 20 (operation 1665). If the NFC tag 30 is not detected again (operation 1660-N), the operation may end. According to another exemplary embodiment of the present general inventive concept, operations 1655 and 1660 may be omitted.

If the page of the mobile application 2502 is not determined to be the scan job page during the second NFC tagging (operation 1640-N), the mobile terminal 20 determines whether the page of the mobile application 2502 is a fax job page (operation 1670). If the page of the mobile application 2502 is not determined to be a fax page (operation 1670-N), the operation ends. If the page of the mobile application 2502 is determined to be a fax job page (operation 1670-Y), the mobile terminal 20 determines whether a content of the mobile terminal 20 is selected in the fax job page (operation 1675). If it is determined that the content of the mobile terminal 20 is selected in the fax job page (operation 1675-Y), the selected content and fax job data including fax detailed settings such as a destination address, a transmission rate, etc., is transmitted to the image forming apparatus 10 (operation 1680), and the operation ends. If it is determined that the content of the mobile terminal 20 is not selected in the fax job page (operation 1675-N), fax job data including a fax transmission command of a local document of the image forming apparatus 10 is transmitted to the image forming apparatus 10 (operation 1685), and the operation ends. The local document may be generated through scanning. Unlike the above, the local document may be a document stored in the storage unit 250 of the image forming apparatus 10. The image forming apparatus 10 may provide a result of the fax transmission to the mobile terminal 20. In another exemplary embodiment of the present general inventive concept, operations 1675 and 1685 or operations 1675 and 1680 may be omitted.

When the mobile terminal 20 instantly performs the event mapped on each page of the mobile application 2502 in the description of FIGS. 16A and 16B, the determination processes of operations 1610, 1625, 1640, and 1670 may be omitted.

Referring back to FIG. 10, the mobile terminal 20 transmits the generated job data to the image forming apparatus 10 (operation 1030). The image forming apparatus 10 may perform an image forming job such as scanning, faxing, or printing according to the job data.

Although in the above description the function of the image forming apparatus 10 is assumed to be scanning, faxing, or printing for convenience of explanation, other functions may be further added or omitted.

In the exemplary embodiment of the present general inventive concept illustrated in FIG. 10, when the mobile application 2502 is already executed and the wireless connection with the image forming apparatus 10 is already established on the mobile terminal 20 before the first NFC tagging, the operation of the mobile terminal 20 may be summarized by operations 1000, 1020, 1025, and 1030. In other words, in this case, the mobile terminal 20 reads out the tag information written to the NFC tag 30 through the first NFC tagging (operation 1000) and determines whether the NFC tag 30 is the tag of the image forming apparatus 10 connected to the mobile terminal 20 based on the read tag information (operation 1020). If the NFC tag 30 is determined to be the tag of the image forming apparatus 10 (operation 1020-Y), data of the job is generated (operation 1025) and is transmitted to the image forming apparatus 10 according to the page displayed on the mobile terminal 20 (operation 1030).

When the operation of the mobile terminal 20 is viewed from a different viewpoint, the mobile terminal 20 detects NFC tagging with 30 where information about the image forming apparatus 10 is written, determines an event to be performed by the NFC tagging according to a job environment of an object that calls NFC API, and performs the determined event based on the read information about the image forming apparatus 10. The object may signify the mobile application 2502 or the embedded application 504 of the mobile OS 2501. The job environment of the object may signify at least one of the establishment of a wireless connection between the mobile terminal 20 and the image forming apparatus 10 and the installation or execution state of the or the mobile application 2502.

From the viewpoint of the NFC tag 30, tag information including at least one of the first field including an application identifier, the second field including application installation information, the third field including a device identifier, the fourth field including a wireless connection authentication code, and the fifth field including a device model name is written to the NFC tag 30 according to the present exemplary embodiment of the present general inventive concept according to the data structure 80. The NFC tag 30 provides the tag information to the mobile terminal 20 according to the NFC tagging of the mobile terminal 20 supporting NFC. The application identifier including the first field of the tag information launches the mobile application 2502 on the mobile terminal 20. The second field of the tag information is a field to install the mobile application 2502. The third and fourth fields of the tag information are fields to automate a wireless connection with the image forming apparatus 10. The fifth field identifies the device model name.

Figure 17:
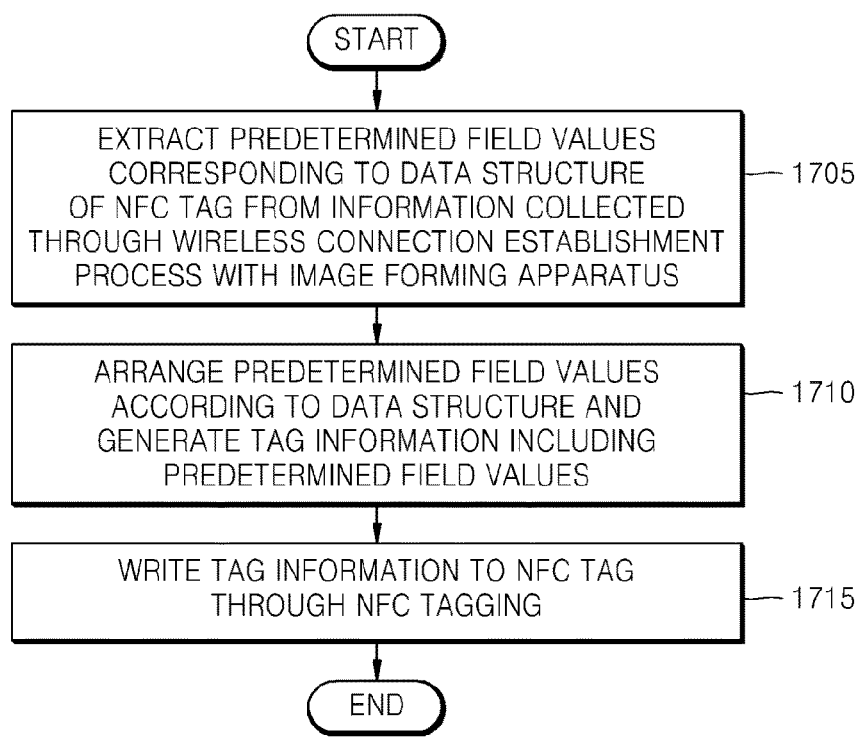
FIG. 17 is a flowchart describing a method of writing an NFC tag according to an exemplary embodiment of the present general inventive concept.

FIG. 17 is a flowchart describing a method of writing the NFC tag 30 according to an exemplary embodiment of the present general inventive concept. The above descriptions may be referred to for the present exemplary embodiment.

Referring to FIG. 17, the mobile terminal 20 extracts predetermined field values corresponding to the data structure 80 of the NFC tag 30 from the information collected through the wireless connection establishment process with the image forming apparatus 10 (operation 1705). The wireless connection establishment process between the mobile terminal 20 and the image forming apparatus 10 may be formed by a user's manual operation and includes a connection via not only Wi-Fi-direct but also AP (802.11 b/g/n). The information collected in the wireless connection establishment process, as described above, includes at least one of an IP address, a MAC address, a device capability, information about a wireless connection type, and a device model name. Also, if the WPS authentication is performed through a user's PIN input, the PIN information may be collected in the wireless connection establishment process.

However, as illustrated in a GUI 170*b* of FIG. 14E, if the WPS authentication is performed through the WPS button provided on the image forming apparatus 10, the mobile terminal 20 may not collected the PIN information of the image forming apparatus 10. When the PIN information is not collected, the PIN information may be requested from the image forming apparatus 10 after the wireless connection is established. Alternatively, for security reasons, the PIN information may not be collected through the wireless connection. Also, the information collected by the mobile terminal 20 further includes information that is exchanged according to Wi-Fi or Wi-Fi-direct, in addition to the above-described information.

The mobile terminal 20 extracts only the information having a meaning to be written to the NFC tag 30 among the collected information. Accordingly, the mobile terminal 20 extracts a field value of the tag information to be written to the NFC tag 30, referring to the data structure 80.

The mobile terminal 20 arranges predetermined field values extracted according to the data structure 80 and generates tag information including the predetermined field values (operation 1710). The extracted field values are written according to the data structure 80 of the NFC tag 30. Accordingly, the extracted field values are arranged according to the data structure 80 to prevent the extracted field values from being written to the NFC tag 30 in a mixed order.

On the other hand, all field values of tag information may not be obtained only with the information collected from the wireless connection establishment process. For example, in an exemplary embodiment in which tag information includes the value of the first field (application identifier) or the value of the second field (application installation information), the value of the first field (application identifier) and the value of the second field (application installation information) are not obtained during the wireless connection establishment process unless they are designed to be separately transmitted by the image forming apparatus 10.

In the following description, it is assumed that the image forming apparatus 10 does not transmit the value of the first field (application identifier) and the value of the second field (application installation information) to the mobile terminal 20 in the wireless connection establishment process with the mobile terminal 20. A process of generating tag information as the mobile terminal 20 further obtains information that is not collected in the wireless connection establishment process will be described later.

The mobile terminal 20 writes the generated tag information to the NFC tag 30 through the NFC tagging (operation 1715). In other words, the NFC module 210 of the mobile terminal 20 operates in the write mode to write the tag information to the NFC tag 30.

Figure 18:
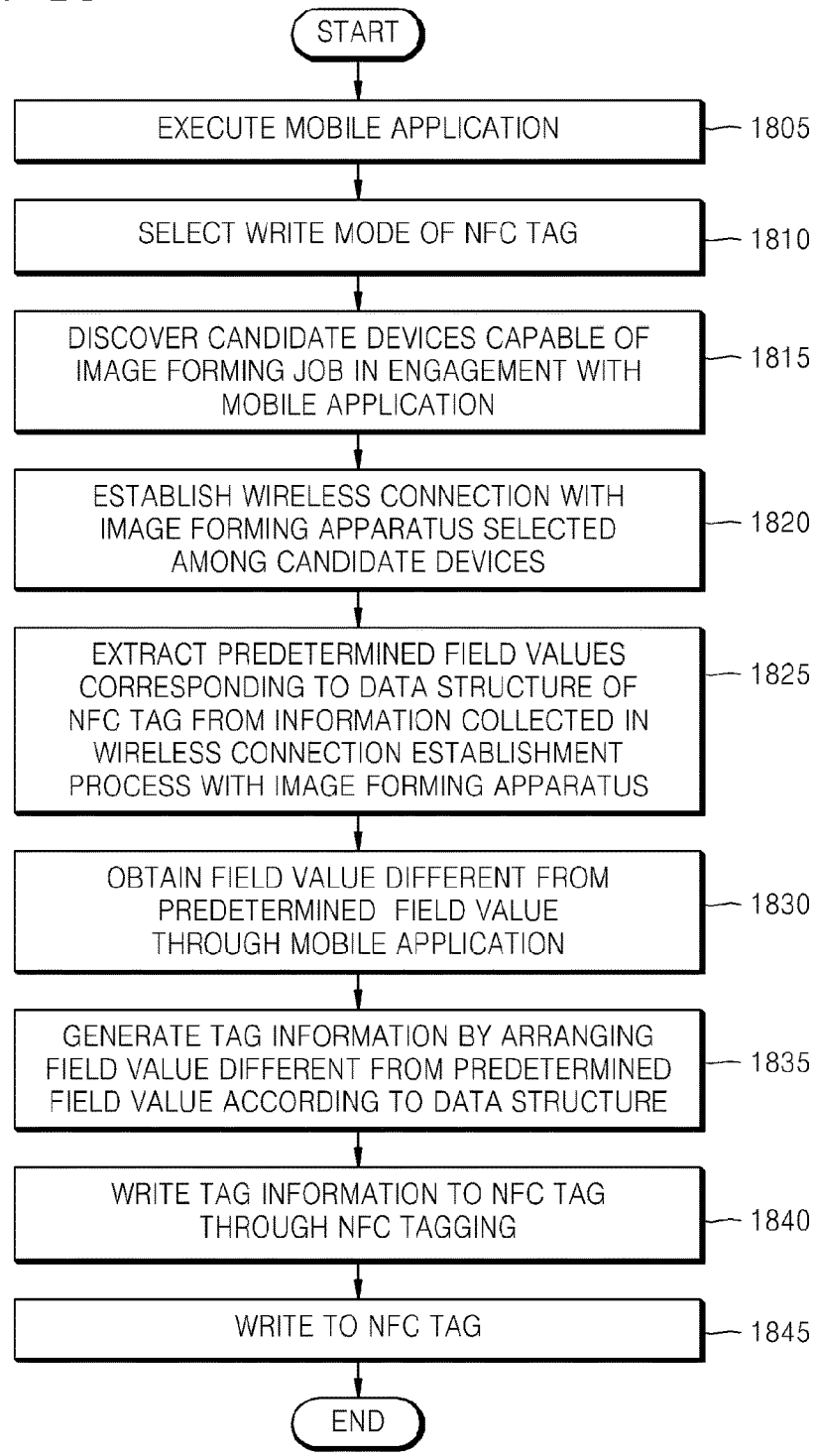
FIG. 18 is a flowchart describing a method of writing an NFC tag according to another exemplary embodiment of the present general inventive concept.

FIG. 18 is a flowchart describing a method of writing the NFC tag 30 according to another exemplary embodiment of the present general inventive concept. The above descriptions may be referred to for the present exemplary embodiment.

Referring to FIG. 18, the mobile terminal 20 executes the mobile application 2502 (operation 1805). The mobile application 2502 may operate in a manager mode other than a general user mode. To operate in a manager mode, a user inputs a manager authentication key to the mobile application 2502. According to another exemplary embodiment of the present general inventive concept, a mobile application for a manager may exist separately from a mobile application for a general user. While including all functions of a mobile application for a general user, a mobile application for a manager may further include a write function of the NFC tag 30. Also, according to another exemplary embodiment of the present general inventive concept, a mobile application for a manager may include only the write function of the NFC tag 30.

The mobile application 2502 may be provided with a write button 1401*b* to select the write function of the NFC tag 30 as illustrated in a GUI 140*b* of FIG. 14C. The mobile terminal 20 receives a selection of the write button 1401b through the user interface unit 230 (operation 1810). The mobile terminal 20 switches the NFC module 210 from the read mode to the write mode.

The mobile terminal 20 discovers candidate devices capable of performing an image forming job in engagement with the mobile application 2502 (operation 1815). The mobile terminal 20 displays the discovered candidate devices like a GUI 145b of FIG. 14C. The mobile terminal 20 may collect at least one information of an IP address, a device model name, and a MAC address of each of the candidate devices from AP (802.11 b/g/n) connected to the candidate devices or wireless connection signaling of the candidate devices, through the discovery of candidate devices.

The mobile application 2502 may display only the candidate devices capable of being engaged with the mobile application 2502 by using the device model name or the device capability information among the information collected in the candidate device discovering process. Accordingly, not all Wi-Fi/Wi-Fi-direct devices are displayed on the mobile terminal 20.

The mobile terminal 20 establishes a wireless connection with the image forming apparatus 10 among the discovered candidate devices (operation 1820). Referring to FIG. 14C, the user selects a Wi-Fi connection button 1451b or a Wi-Fi-direct connection button 1452b of the candidate devices displayed on the mobile terminal 20 so as to select any one candidate device (the image forming apparatus 10). In the wireless connection establishment process, the mobile terminal 20 performs response signaling including "Get device capability" to the wireless connection signaling of the image forming apparatus 10 or AP (802.11 b/g/n) connected to the image forming apparatus 10. Next, the mobile terminal 20 obtains information about the device capability of the image forming apparatus 10 from the image forming apparatus 10. A detailed description about the information collected through the wireless connection is already described above.

The mobile terminal 20 extracts predetermined field values corresponding to the data structure 80 of the NFC tag 30 from the information collected in the wireless connection establishment process with the image forming apparatus 10 (operation 1825). The mobile terminal 20 may extract at least one of the device identifier included in the third field, the device model name included in the fifth field, the device capability included in the sixth field, and the wireless connection type included in the seventh field, in the tag information.

The mobile terminal 20 obtains a field value different from the predetermined field value extracted from the mobile application 2502 (operation 1830). The different field value may include at least one of the application identifier included in the first field and the application installation information included in the second field, in the tag information. In other words, the mobile terminal 20 extracts the application identifier and application installation information of the mobile application 2502 that is currently executed.

The authentication code included in the fourth field of the tag information may be directly input by the user to the mobile terminal 20. The mobile terminal 20 may output a dialog to receive an input of the authentication code. If the authentication code is input, the mobile terminal 20 may check validity of data of the input authentication code and then encrypt the authentication code.

As a method of checking the authentication code, the user may check the PIN set on the image forming apparatus 10 by using a print report function to check a setting value of the image forming apparatus 10. According to another exemplary embodiment of the present general inventive concept, the mobile terminal 20 may obtain the authentication code of the image forming apparatus 10 from the FW providing server 70. In another exemplary embodiment of the present general inventive concept, the mobile terminal 20 may extract the authentication code during FW update when FW update data includes the authentication code.

In another exemplary embodiment of the present general inventive concept, the NFC tag 30 may be written except for the authentication code. In this case, the writing of the NFC tag 30 except for the authentication code is first performed and the authentication code of the NFC tag 30 may be secondly written according to the exemplary embodiment of FIG. 13.

The mobile terminal 20 generates tag information by arranging field values different from predetermined field values according to the data structure 80 (operation 1835). For example, the application identifier, the application installation information, the device identifier, the device model name, the device capability, and the information about a wireless connection type are respectively arranged in the first field, the second field, the third field, the fifth field, the sixth field, and the seventh field of the tag information. However, when a field value exists that the mobile terminal 20 cannot identify, a corresponding field may be processed to be a random value or a null value.

Figure 14D:
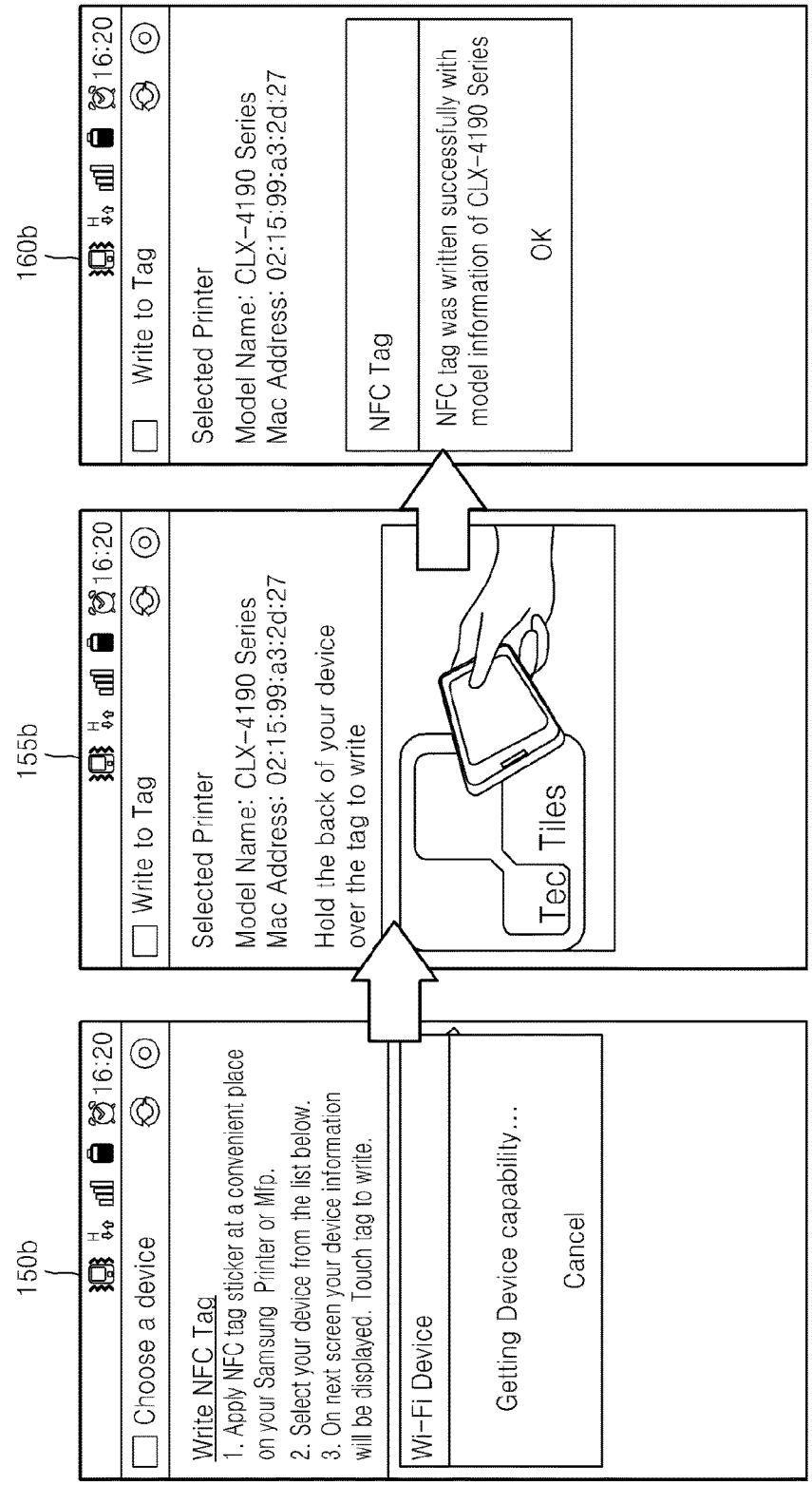

When the generation of the tag information is completed, the mobile terminal 20 may guide the NFC tagging to a use as illustrated in a GUI 155b of FIG. 14D. The mobile terminal 20 writes tag information to the NFC tag 30 through the NFC tagging (operation 1840). In doing so, the NFC module 210 of the mobile terminal 20 operates in the write mode as described above. When the value of the fourth field (authentication code) of the tag information is not known, the mobile terminal 20 may skip writing or write a random value or a null value.

When the writing of the NFC tag 30 is completed, the mobile terminal 20 is switched from the write mode to the read mode (operation 1845). As illustrated in a GUI 160b of FIG. 14D, the mobile terminal 20 notifies the completion of writing and may be switched to the read mode when the "OK" button is selected.

When the value of the fourth field (authentication code) of the tag information is not known and thus the writing is skipped or a random value or a null value is written, the mobile terminal 20 may write the value of the fourth field (authentication code) by performing the process of FIG. 13.

When the image forming apparatus 10 supports only the authentication via the WPS button, the FW of the image forming apparatus 10 may be updated so that the image forming apparatus 10 may support the PIN authentication. If the image forming apparatus 10 does not support the PIN authentication, the wireless connection between the mobile terminal 20 and the image forming apparatus 10 may not be automatically performed even when the NFC tag 30 is used.

Figure 19:
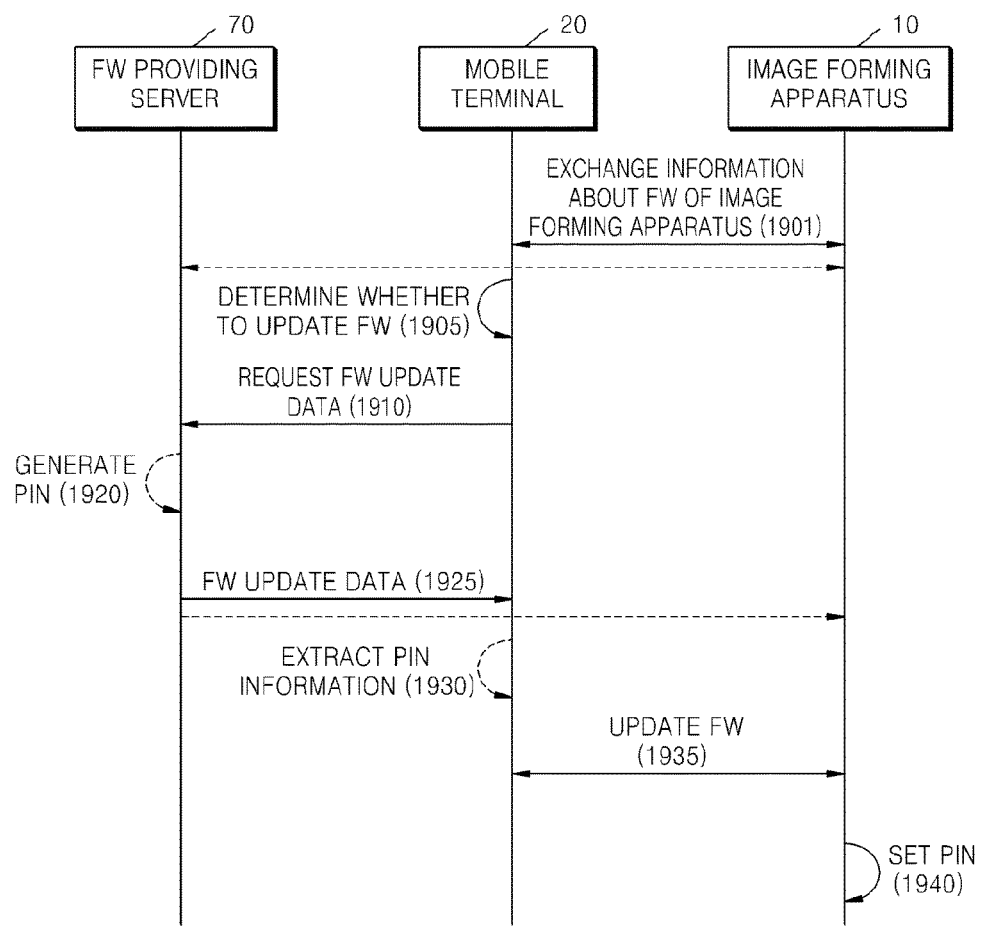
FIG. 19 illustrates a method of updating firmware of an image forming apparatus, according to an exemplary embodiment of the present general inventive concept.

A method of updating FW of the image forming apparatus 10 will be described with reference to FIG. 19. In FIG. 19, a dotted arrow indicates an operation that may be selectively performed or omitted according to an exemplary embodiment of the present general inventive concept. For example, the image forming apparatus 10 may directly receive FW update data from the FW providing server 70 and update FW of the image forming apparatus 10. In another exemplary embodiment of the present general inventive concept, the FW of the image forming apparatus 10 may be updated under the control of the mobile terminal 20.

First, the mobile terminal 20 and the image forming apparatus 10 exchange information about FW of the image forming apparatus 10 (operation 1901). The dotted arrow illustrated under operation 1901 indicates a case in which the mobile terminal 20 is not involved, and instead firmware information of the image forming apparatus 10 is sent directly from the image forming apparatus 10 to the FW providing server 70.

If mobile terminal 20 is involved, it determines whether the FW of the image forming apparatus 10 needs to be updated (operation 1905). In other words, the mobile terminal 20 checks the FW version of the image forming apparatus 10 and checks whether the FW version of the image forming apparatus 10 supports PIN authentication.

When it is determined that the FW version of the image forming apparatus 10 does not support PIN authentication, the mobile terminal 20 requests FW update data from the FW providing server 70 (operation 1910). When requesting FW update data, the mobile terminal 20 may transmit information about a MAC address and a device model name of the image forming apparatus 10 to the FW providing server 70.

Upon receiving request for FW updated data from the mobile terminal 20 or receiving FW information directly from the information apparatus 10, the FW providing server 70 transmits the FW update data to the mobile terminal 20 (operation 1925). The mobile terminal 20 updates the FW of the image forming apparatus 10 by using the received FW update data (operation 1935). The dotted arrow illustrated under operation 1925 indicates a case in which the mobile terminal 20 is not involved, and the FW update data is sent directly to the image forming apparatus 10.

When the FW of the image forming apparatus 10 is updated, the image forming apparatus 10 sets a PIN value to be used to authenticate a wireless connection (operation 1940). In a method of setting a PIN value of the image forming apparatus 10, a user accesses a system setting web page provided by a web server included in the image forming apparatus 10 through a web browser included in the image forming apparatus 10. A user may set a PIN value in the system setting web page. In another exemplary embodiment of the present general inventive concept, a user accesses the system setting web page through the mobile terminal 20 to set the PIN value. In another exemplary embodiment of the present general inventive concept, the PIN value is already included in the FW update data and thus the PIN may be automatically set during the FW update.

According to an exemplary embodiment of the present general inventive concept in which a PIN value is included in the FW update data, the FW providing server 70 generates a PIN value (operation 1920) by using at least one of a MAC address and a device model name of the image forming apparatus 10. The generated PIN value may be stored in the FW providing server 70.

When the PIN value is included in the FW update data, the mobile terminal 20 may extract a PIN from the FW update data (operation 1930) prior to updating the firmware of the image forming apparatus 10. The extracted PIN may be used to write the NFC tag 30 as described above.

Figure 6:
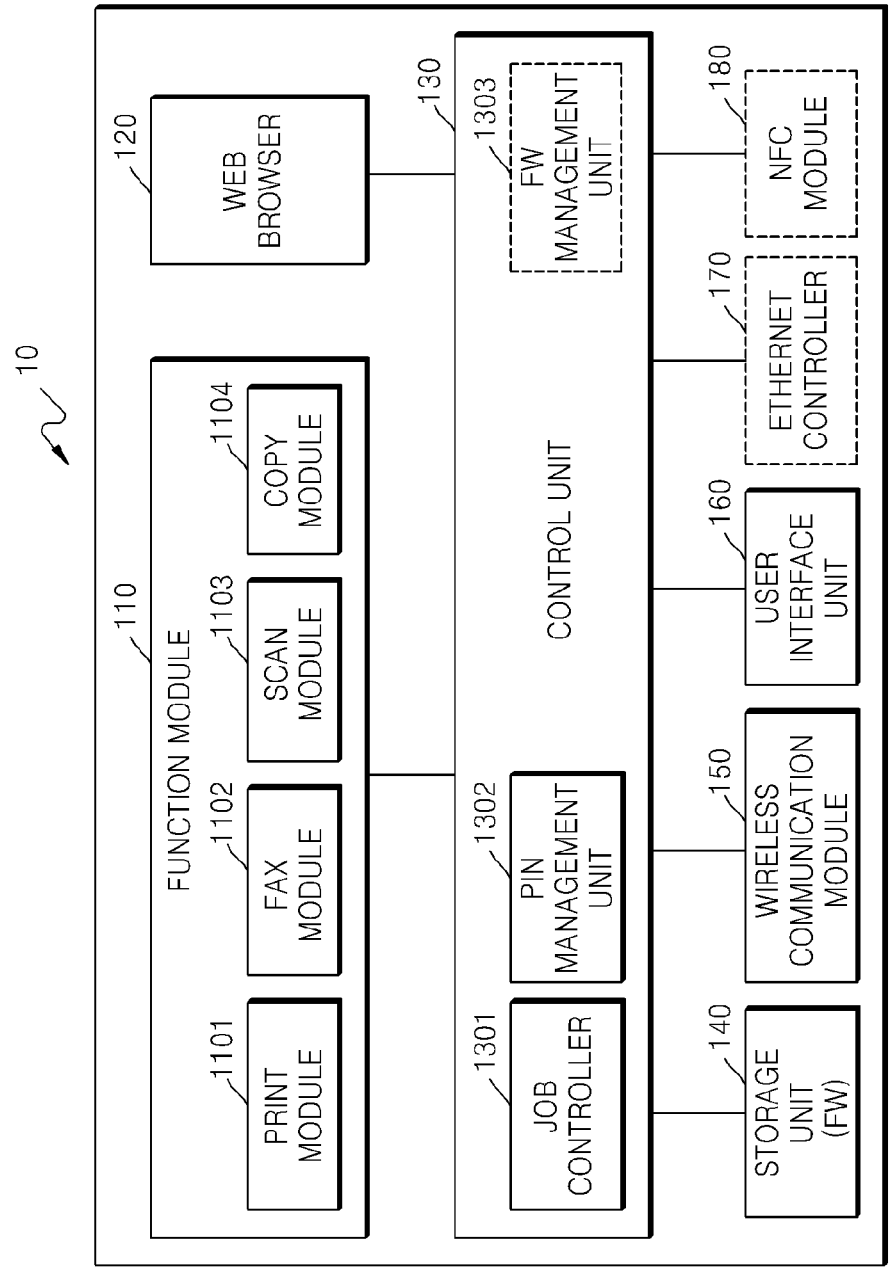
FIG. 6 is a block diagram schematically illustrating an image forming apparatus according to an exemplary embodiment of the present general inventive concept.

FIG. 6 is a block diagram schematically illustrating the image forming apparatus 10 according to an exemplary embodiment of the present general inventive concept. The above descriptions may be referred to for the present exemplary embodiment. In the present exemplary embodiment, the image forming apparatus 10 is illustrated to be an MFP, but any one of a printer, a scanner, a facsimile, or a copier, each performing a single function, may be the image forming apparatus 10, according to the exemplary embodiment.

Referring to FIG. 6, the image forming apparatus 10 includes a function module 110, a web browser 120, a control unit 130, a storage unit 140, a wireless communication module 150, a user interface unit 160, an Ethernet controller 170, and an NFC module 180. The elements indicated by a dotted line may be omitted according to an exemplary embodiment of the present general inventive concept.

The function module 110 includes a print module 1101, a fax module 1102, a scan module 1103, and a copy module 1104, respectively performing a print function, a fax transceiving function, a document scanning function, and a document copying function.

The Ethernet controller 170 signifies hardware performing wired Ethernet communication according to IEEE 802.3.

The wireless communication module 150 establishes a Wi-Fi or Wi-Fi-direct connection via AP. The wireless communication module 150 may be understood from the description about the wireless communication module 220 of the mobile terminal 20.

The web browser 120 accesses a web page through the wireless communication module 150 or the Ethernet controller 170. The web browser 120 may access a system setting web page provided by a FW management unit 1303 to set the system. In this case, a user may set or output the above-described PIN value through the web browser 120.

The storage unit 140 stores print data, fax documents, scan documents, emails, etc. The storage unit 140 may include a folder (hereinafter, referred to as the document box) generated according to a file server function of the image forming apparatus 10. The document box may include a personalized box generated for each user and a common box of which use by all users is permitted. A file that may be stored in the document box may include a print job, print data of a PDL language, rendered print data, an image file, a word document, etc., in addition to the above-described fax documents, scan documents, and emails. However, the present general inventive concept is not limited thereto. Also, the storage unit 140 stores FW of the image forming apparatus 10.

The user interface unit 160 is hardware functioning as a medium to check information of the image forming apparatus 10 and for a user to input a command to the image forming apparatus 10. The user interface unit 160 may be understood from the description about the user interface unit 230 of the mobile terminal 20. The user interface unit 160 may be embodied for example by a touch screen.

The NFC module 180 may include an NFC chipset like the NFC module 210 of the mobile terminal 20. In this case, as described above, the image forming apparatus 10 and the mobile terminal 20 may operate in a P2P mode. In another exemplary embodiment, the NFC module 180 includes a slot to install the NFC tag 30, supplies electric power so that the NFC tag 30 may operate as an active tag, and allows the image forming apparatus 10 to read and write with respect to the NFC tag 30. The NFC module 180 may be omitted according to an exemplary embodiment of the present general inventive concept.

The control unit 130 performs a function of controlling an overall operation of the image forming apparatus 10. Information needed for control is stored in the storage unit 140 and read out when necessary. The control unit 130 includes a job controller 1301, a PIN management unit 1302, and a FW management unit 1303.

The job controller 1301 registers and performs a print, scan, or fax job according to job data received from the mobile terminal 20.

The FW management unit 1303 manages the FW stored in the storage unit 140 of the image forming apparatus 10. The FW management unit 1303 updates FW through the mobile terminal 20 or by directly accessing the FW providing server 70. The FW management unit 1303 may include a web server function and provide a web page to set the system, as described above.

The PIN management unit 1302 manages PIN set on the image forming apparatus 10. The PIN management unit 1302 may be added in FW as FW is updated. The PIN management unit 1302 performs WPS authentication when a wireless connection with the mobile terminal 20 is established. A detailed description about the WPS authentication is already described above.

Figure 7:
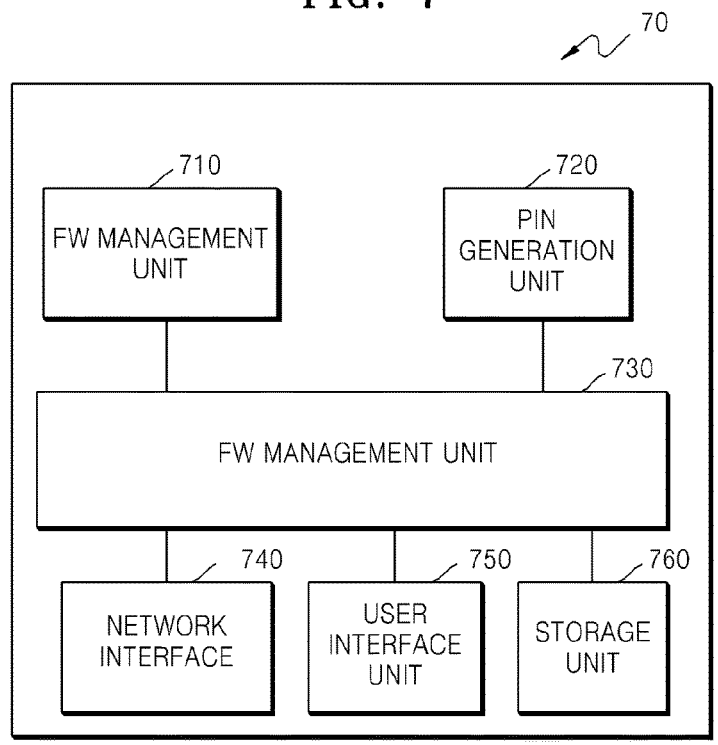
FIG. 7 is a block diagram schematically illustrating an FW providing server according to an exemplary embodiment of the present general inventive concept.

FIG. 7 is a block diagram schematically illustrating the FW providing server 70 according to an exemplary embodiment of the present general inventive concept. Referring to FIG. 7, the FW providing server 70 includes a FW management unit 710, a PIN generation unit 720, a control unit 730, a network interface 740, a user interface unit 750, and a storage unit 760.

The FW management unit 710 provides FW update data stored in the storage unit 760 according to a request of the mobile terminal 20 or the image forming apparatus 10. The FW management unit 710 may provide FW update data suitable for the image forming apparatus 10 referring to a device model name or a MAC address of the image forming apparatus 10.

The network interface 740 establishes a wired/wireless connection with the mobile terminal 20 or the image forming apparatus 10 and transmits the FW update data.

The user interface unit 750 provides an I/O port that may be connected to a human interface device (HID) or a monitor.

The PIN generation unit 720 generates a PIN value to be set on the image forming apparatus 10 when FW update is requested. The PIN generation unit 720 may generate PIN by using a MAC address, a device model name, etc. of the image forming apparatus 10. The generated PIN value may be stored in the storage unit 760. The PIN generation unit 720 may be omitted.

The control unit 730 performs a function of controlling an overall operation of the FW providing server 70. Information needed for control is stored in the storage unit 760 and read out when necessary.

A GUI of the mobile terminal 20 in the method of writing the NFC tag 30 according to the present exemplary embodiment will be described with reference to FIGS. 14C-14E.

First, referring to FIG. 14C, the mobile application 2502 is executed in the mobile terminal 20 and a print job page is selected in the mobile application 2502. As described above, the GUI 140*b* includes the write button 1401*b* to write the NFC tag 30.

When the write button 1401*b* is selected, the mobile terminal 20 discovers candidate devices and displays the discovered candidate devices on the GUI 145*b*. The GUI 145*b* displays a Wi-Fi device, for example "CLX-4190 Series", and a Wi-Fi-direct device, for example "Direct90dMCLX-4190 Series", as candidate devices. The GUI 145*b* includes buttons 1451*b* and 1452*b* to select each device.

When a user select the button 1451*b*, the mobile terminal 20 obtains device capability of Wi-Fi device "CLX-4190 Series" through Wi-Fi and outputs the GUI 150*b* of FIG. 14D.

Next, when the generation of tag information is completed, the mobile terminal 20 guides NFC tagging through the GUI 155*b* of FIG. 14D. When writing the NFC tag 30 is completed, the mobile terminal 20 outputs the GUI 160*b*.

If the button 1452*b* is selected in FIG. 14C, the mobile terminal 20 outputs the GUI 165*b* of FIG. 14E and tries a wireless connection to Wi-Fi-direct device "Direct90dMCLX-4190 Series" via Wi-Fi-direct. Then, since WPS authentication with "Direct90dMCLX-4190 Series" is needed, the mobile terminal 20 outputs the GUI 170*b* to guide pressing the WPS button (not illustrated) of "Direct90dMCLX-4190 Series". When the WPS button is pressed, the mobile terminal 20 outputs the GUI 175*b* and establishes a wireless connection. Then, like the above-described GUI of a Wi-Fi connection, device capability of "Direct90dMCLX-4190 Series" is obtained and the GUI 150*b* of FIG. 14D is output. Next, when the generation of tag information is completed, the mobile terminal 20 guide NFC tagging through the GUI 155*b* of FIG. 14D. When the writing of the NFC tag 30 is completed, the mobile terminal 20 outputs the GUI 160*b*.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, tag information may be easily written so that an NFC tag of the image forming apparatus may be used and a wireless connection between a mobile terminal and an image forming apparatus may be conveniently established without damaging security. Also, since the image forming apparatus performs an image forming job with only NFC tagging of the mobile terminal, usability in manipulating the mobile terminal may be improved.

Furthermore, the present general inventive concept is directed to an NFC tag 30 including tag information divided into a plurality of fields. Each field includes discrete information which a mobile terminal 20 uses separately from each other to perform different operations associated with controlling an electronic apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of writing data to a near field communication (NFC) tag using a mobile terminal, the method comprising:
   executing a mobile application on the mobile terminal;
   displaying a user interface screen for receiving at least one field value on the mobile terminal in response to a user input for selecting an NFC tag write function;
   receiving the at least one field value through the user interface screen; and
   writing the received at least one field value to the NFC tag attached to an image forming apparatus if the mobile terminal is located within a predetermined distance from the NFC tag,
   wherein the displaying of the user interface screen comprises:
      receiving authentication information for an administrator;
      entering an administrator mode if the received authentication information is verified;
      receiving the user input for selecting the NFC tag write function; and
      displaying the user interface screen on the mobile terminal.

2. The method of claim 1, wherein the received at least one field value is necessary for establishing a peer-to-peer (P2P) connection between the mobile terminal and the image forming apparatus through an NFC tagging.

3. The method of claim 1, wherein the writing of the received at least one field value comprises:
   generating tag information with the received at least one field value and another at least one field value extracted from information collected while establishing a wireless connection between the mobile terminal and the image forming apparatus; and
   writing the tag information to the NFC tag.

4. The method of claim 3,
   wherein the extracted at least one field value corresponds to a data structure of the NFC tag, and
   wherein the tag information is generated by arranging the field values according to the data structure of the NFC tag.

5. The method of claim 1,
   wherein the received at least one field value comprises an authentication code needed to establish a peer-to-peer (P2P) connection with the image forming application, and
   wherein the writing of the received at least one field value comprises:
      encrypting the authentication code; and
      writing the encrypted authentication code to the NFC tag.

6. A non-transitory computer readable recording medium having recorded thereon instructions to execute a method of writing data to a near field communication (NFC) tag using a mobile terminal, the non-transitory computer readable recording medium comprising:
   instructions to execute a mobile application on the mobile terminal;
   instructions to display a user interface screen for receiving at least one field value on the mobile terminal in response to a user input for selecting an NFC tag write function;
   instructions to receive the at least one field value through the user interface screen; and
   instructions to write the received at least one field value to the NFC tag attached to an image forming apparatus if the mobile terminal is located within a predetermined distance from the NFC tag,
   wherein the instructions to display the user interface screen comprise:
      instructions to receive authentication information for an administrator;
      instructions to enter an administrator mode if the received authentication information is verified;
      instructions to receive the user input for selecting the NFC tag write function; and
      instructions to display the user interface screen on the mobile terminal.

7. The non-transitory computer readable recording medium of claim 6, wherein the received at least one field value is necessary for establishing a peer-to-peer (P2P) connection between the mobile terminal and the image forming apparatus through an NFC tagging.

8. The non-transitory computer readable recording medium of claim 6, wherein the instructions to write the received at least one field value comprise:
   instructions to generate tag information with the received at least one field value and another at least one field value extracted from information collected while establishing a wireless connection between the mobile terminal and the image forming apparatus; and
   instructions to write the tag information to the NFC tag.

9. The non-transitory computer readable recording medium of claim 8,
   wherein the extracted at least one field value corresponds to a data structure of the NFC tag, and
   wherein the instructions to generate the tag information comprise instructions to arrange the field values according to the data structure of the NFC tag.

10. The non-transitory computer readable recording medium of claim 6,
    wherein the received at least one field value comprises an authentication code needed to establish a peer-to-peer (P2P) connection with the image forming application, and
    wherein the instructions to write the received at least one field value comprise:
    instructions to encrypt the authentication code; and
    instructions to write the encrypted authentication code to the NFC tag.

* * * * *

UNITED STATES PATENT AND TRADEMARK OFFICE
CERTIFICATE OF CORRECTION

PATENT NO. : 10,229,297 B2  
APPLICATION NO. : 15/259748  
DATED : March 12, 2019  
INVENTOR(S) : Wu-seok Jang et al.

Page 1 of 1

It is certified that error appears in the above-identified patent and that said Letters Patent is hereby corrected as shown below:

On the Title Page

In Column 1, item (71), Applicant, Lines 1-2, delete "S-PRINTING SOLUTION CO., LTD., Suwon-si (KR)" and insert -- HP PRINTING KOREA CO., LTD., Suwon-si, Gyeonggi-do (KR) --, therefor.

In the Drawings

In sheet 19 of 25, FIG. 14E, reference numeral 170b, Line 10, delete "he" and insert -- the --, therefor.

Signed and Sealed this  
Sixteenth Day of July, 2019

Andrei Iancu  
*Director of the United States Patent and Trademark Office*